United States Patent
Farmanyan et al.

(10) Patent No.: US 11,555,731 B2
(45) Date of Patent: Jan. 17, 2023

(54) TDR TRANSDUCER WITH BOOMERANG WAVEGUIDE

(71) Applicant: Rochester Gauges, LLC, Dallas, TX (US)

(72) Inventors: Gagik Farmanyan, Plano, TX (US); Chester Roy Wildey, Euless, TX (US)

(73) Assignee: ROCHESTER SENSORS, LLC, Dallas, TX (US)

( * ) Notice: Subject to any disclaimer, the term of this patent is extended or adjusted under 35 U.S.C. 154(b) by 696 days.

(21) Appl. No.: 16/384,469

(22) Filed: Apr. 15, 2019

(65) Prior Publication Data
US 2019/0310125 A1 Oct. 10, 2019

Related U.S. Application Data

(63) Continuation-in-part of application No. 16/173,993, filed on Oct. 29, 2018, now Pat. No. 11,099,052.
(Continued)

(51) Int. Cl.
*G01F 23/284* (2006.01)

(52) U.S. Cl.
CPC .................. *G01F 23/284* (2013.01)

(58) Field of Classification Search
CPC ..................................................... G01F 23/284
See application file for complete search history.

(56) References Cited

U.S. PATENT DOCUMENTS

| 5,609,059 A | 3/1997 | McEwan |
|---|---|---|
| 6,285,195 B1 | 9/2001 | Needle |

(Continued)

FOREIGN PATENT DOCUMENTS

| CA | 3082816 A1 | 5/2019 |
|---|---|---|
| CN | 207335822 U | 5/2018 |

(Continued)

OTHER PUBLICATIONS

European Search Report as issued in connection with European Patent Application No. EP3647745A1 completed on Nov. 11, 2019, 2 pages.

(Continued)

*Primary Examiner* — Lisa M Caputo
*Assistant Examiner* — Alex T Devito
(74) *Attorney, Agent, or Firm* — Howard IP Law Group, PC

(57) ABSTRACT

A time domain reflectometer (TDR) transducer (10) for determining a level (24) of liquid (16) in a container (12) includes a first electrode (34) and a second electrode portion (36) with a measuring volume (114) therebetween for receiving material (16) to be measured. The second electrode portion (36) has a shielded electrode section (36A) isolated from the first electrode (34) and an unshielded electrode section (36B), such that an energy pulse propagates along the shielded electrode section (36A) without signal loss, and boomerangs along a second opposite direction across the first conductive electrode portion (34), the measuring volume (114) and the unshielded electrode section (36B) where partial reflection of the pulse occurs at least at the interface (24) of the material (16) to create a return echo that travels in reverse direction, boomeranging back through the shielded electrode section (36A) for analysis by an electronic assembly (32).

25 Claims, 12 Drawing Sheets

Related U.S. Application Data

(60) Provisional application No. 62/631,408, filed on Feb. 15, 2018, provisional application No. 62/586,160, filed on Nov. 14, 2017.

(56) References Cited

U.S. PATENT DOCUMENTS

| | | | |
|---|---|---|---|
| 2001/0050629 A1* | 12/2001 | Benway | G01S 13/88 342/204 |
| 2008/0036649 A1 | 2/2008 | Lyon | |
| 2011/0199103 A1 | 8/2011 | Osswald et al. | |
| 2011/0209543 A1* | 9/2011 | Miskell | G01F 23/284 73/290 R |
| 2014/0085133 A1 | 3/2014 | Flasza et al. | |
| 2014/0159743 A1 | 6/2014 | Dayal et al. | |
| 2015/0084809 A1 | 3/2015 | Flasza et al. | |
| 2016/0187179 A1 | 6/2016 | Hrncir et al. | |
| 2016/0245685 A1 | 8/2016 | Gerding et al. | |
| 2019/0011308 A1 | 1/2019 | Edvardsson et al. | |
| 2019/0025234 A1 | 1/2019 | Weightman et al. | |
| 2020/0343678 A1 | 10/2020 | Shirai et al. | |

FOREIGN PATENT DOCUMENTS

| | | |
|---|---|---|
| DE | 102008043252 A1 | 5/2010 |
| EP | 1069649 A1 | 1/2001 |
| EP | 2741059 A1 | 6/2014 |
| EP | 3035041 A1 | 6/2016 |
| EP | 3647745 A1 | 5/2020 |
| WO | 2016090191 A1 | 6/2016 |
| WO | 2019099301 A1 | 5/2019 |

OTHER PUBLICATIONS

International Search Report and Written Opinion as issued in connection with International Patent Application No. PCT/US2018/060100 dated May 23, 2019, 6 pages.

* cited by examiner

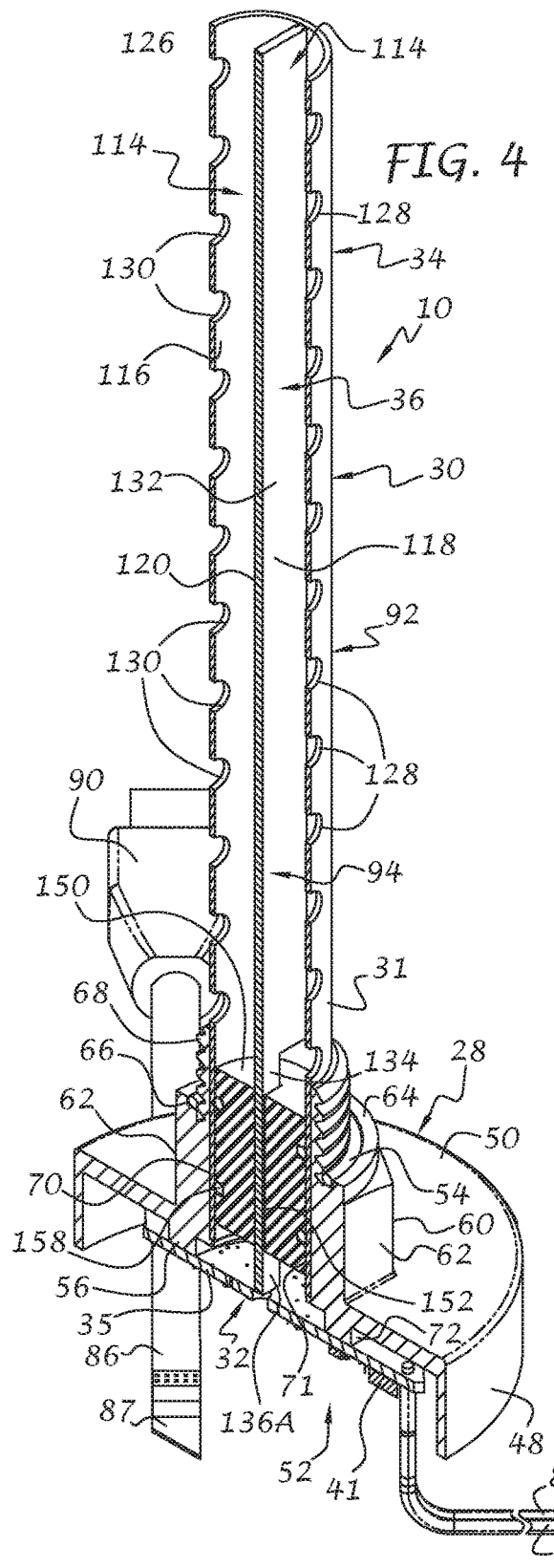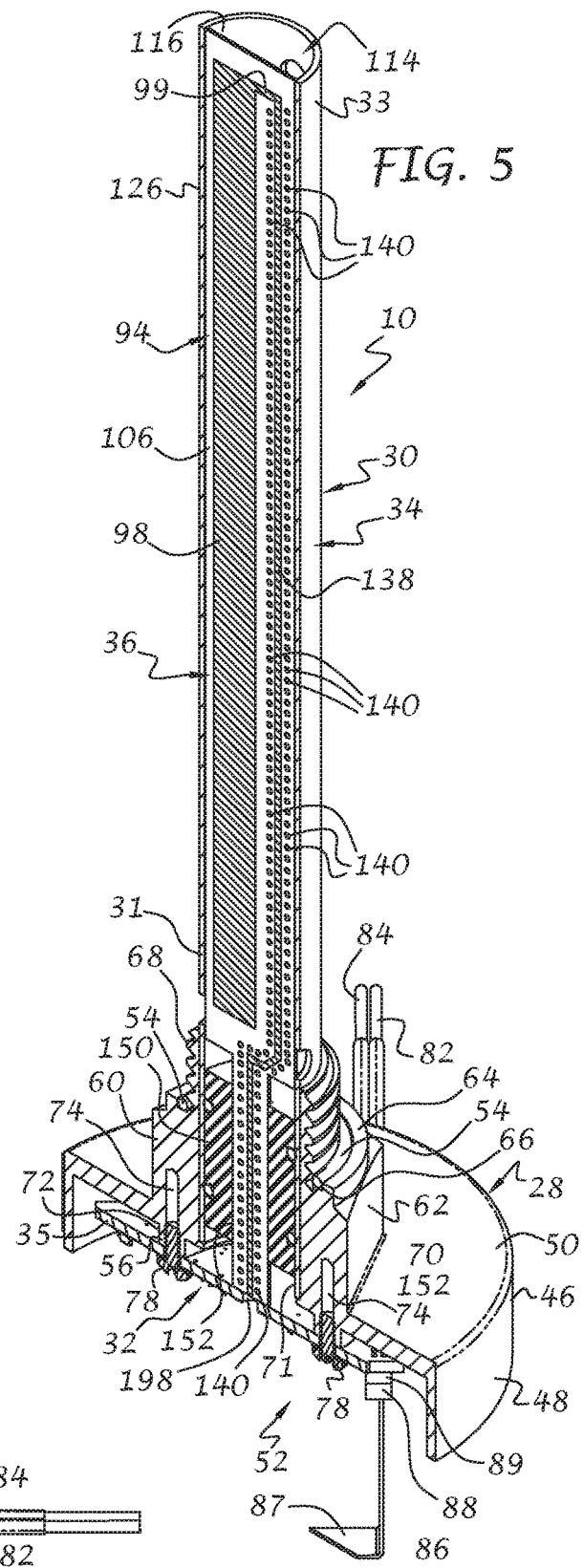

TDR TRANSDUCER WITH BOOMERANG WAVEGUIDE

CROSS-REFERENCE TO RELATED APPLICATIONS

This application claims the benefit of U.S. Provisional Application No. 62/631,408 filed on Feb. 15, 2018. This application claims priority to U.S. application Ser. No. 16/173,993 filed on Oct. 29, 2018, which claims the benefit of U.S. Provisional application No. 62/586,160 filed on Nov. 14, 2017, the disclosures of which are hereby incorporated by reference in their entirety.

BACKGROUND OF THE INVENTION

This invention relates generally to the measurement of one or more material properties, and more particularly to an apparatus and method for determining liquid level and using time domain reflectometry (TDR) for determining at least a level or height of a material within a container, or the position of one object with respect to another, and/or a dielectric constant, specific gravity, permittivity, or other property of the liquid, fluid, and/or material of interest.

Prior art devices that employ time domain reflectometry (TDR) are typically very expensive and thus not feasible for low-cost devices required for certain products and markets that are cost-competitive. For example, known TDR sensors for determining liquid level within a container require high-cost high-precision electronic components, including high-precision temperature sensors, capacitors, resistors, and expensive microcontrollers with very high accuracy timers to determine liquid level with a relatively high degree of accuracy. Such TDR devices also employ expensive parts that interface with the measuring probe and the electronics, and can require more assembly and calibration time than desired, as well as the need for expensive calibration equipment during factory calibration, resulting in prohibitive costs that can rarely be justified except where the highest measurement accuracy is required.

In addition, prior art TDR devices are typically mounted at the top of a tank so that the coaxial probe extends into the tank from the top to the bottom thereof. When an electromagnetic pulse is introduced along the coaxial probe, a measurable return echo is created at the air/liquid interface. These types of devices, although expensive, can work well and produce accurate results when the dielectric constant k of the liquid being measured is relatively low. However, when the liquid has a relatively high dielectric constant, such as Freon (k=11), water (k=80), and so on, the energy from the radar wave is quickly dissipated and accuracy is compromised, if measurements can be made at all.

Dissipation of the radar wave is even more problematic with tanks that have bottom mounting configurations for receiving a liquid level transducer. When the TDR transducer is mounted at the bottom of the tank holding a liquid, with the coaxial probe extending upwardly into the tank from the bottom, the electromagnetic energy can dissipate into the fluid and may fail to produce a return echo at the liquid/air interface, and thus liquid level measurement may not occur. This is especially problematic with liquids having a high dielectric constant, as the liquid level in the tank increases, creating a situation where even liquids with a lower dielectric constant may cause sufficient dissipation of the electromagnetic pulse so that the generation of a measurable return echo at the liquid/air interface does not occur, resulting in failure of the liquid level measurement.

It would therefore be desirous to provide a TDR transducer that overcomes one or more of the disadvantages of prior art solutions.

SUMMARY OF THE INVENTION

In accordance with one aspect of the invention, a time domain reflectometer (TDR) transducer for determining at least one property of a material includes a first electrode portion with a first conductive body, a second electrode portion with a first shielded electrode section and a second unshielded electrode section, and an inner measuring volume located between the first conductive body and the second unshielded electrode section for receiving material to be measured. The first shielded electrode section is electrically isolated from the first conductive body to thereby form a first shielded transmission line segment with a first nominal impedance value unaffected by the presence or absence of material to be measured in the inner measuring volume. In this manner, an signal propagates virtually unimpeded along the first shielded transmission line segment in a first direction and a return echo portion of the signal propagates virtually unimpeded therealong in a second direction opposite to the first direction to thereby reduce or eliminate deterioration of the signal and/or return echo therealong.

In accordance with a further aspect of the invention, a TDR transducer for determining a position of a medium to be measured within a tank includes a housing adapted for connection a lower wall of the tank and an elongate measuring probe having a proximal end connected to the housing and a distal end extending upward into the tank. The elongate measuring probe has outer elongate electrode portion connected to the housing and an inner elongate electrode portion spaced from the outer elongate electrode portion. The inner elongate electrode portion includes a shielded electrode section adapted for extending upwardly into the tank along a length of the outer elongate electrode and an unshielded electrode section electrically connected to the shielded electrode section and adapted for extending downwardly toward the housing. The unshielded electrode section is spaced from the outer elongate electrode to create an inner elongate measuring volume therebetween. With this construction, transmission of energy pulse along the shielded electrode segment ensures that the outer elongate electrode portion is bypassed, resulting in a steady-state first nominal impedance value with little or no signal loss independent of the presence or absence of material to be measured inside the inner elongate measuring volume, while transmission of the energy pulse between the unshielded electrode section and outer elongate electrode across the inner measuring space ensures exposure of the energy pulse at least to an interface of the material to be measured when located in the inner measuring volume for generating a return echo when a sufficient change in impedance from the nominal impedance value occurs with respect to the outer electrode portion and the inner unshielded electrode section to thereby determine the position of the medium located in the inner elongate space.

In accordance with a further aspect of the invention, the TDR transducer can have multiple electronic means for transmitting and receiving energy pulses from opposite ends of the elongate measuring probe to measure multiple properties of the liquid or other material located in the inner measuring volume, such as liquid level within a tank and a dielectric constant of the liquid or other material.

Other aspects, objects and advantages of the invention will become apparent upon further study of the following description in conjunction with the attached drawings.

BRIEF DESCRIPTION OF THE DRAWINGS

The following detailed description of the preferred embodiments of the present invention will be best understood when considered in conjunction with the accompanying drawings, wherein like designations denote like elements throughout the drawing figures, and wherein:

FIG. 4 is a sectional view thereof taken along line 4-4 of FIG. 3;

FIG. 5 is a sectional view thereof taken along line 5-5 of FIG. 3;

It is noted that the drawings are intended to depict only exemplary embodiments of the invention and therefore should not be considered as limiting the scope thereof. It is further noted that the drawings are not necessarily to scale. The invention will now be described in greater detail with reference to the accompanying drawings.

DETAILED DESCRIPTION OF THE INVENTION

Figure 1:
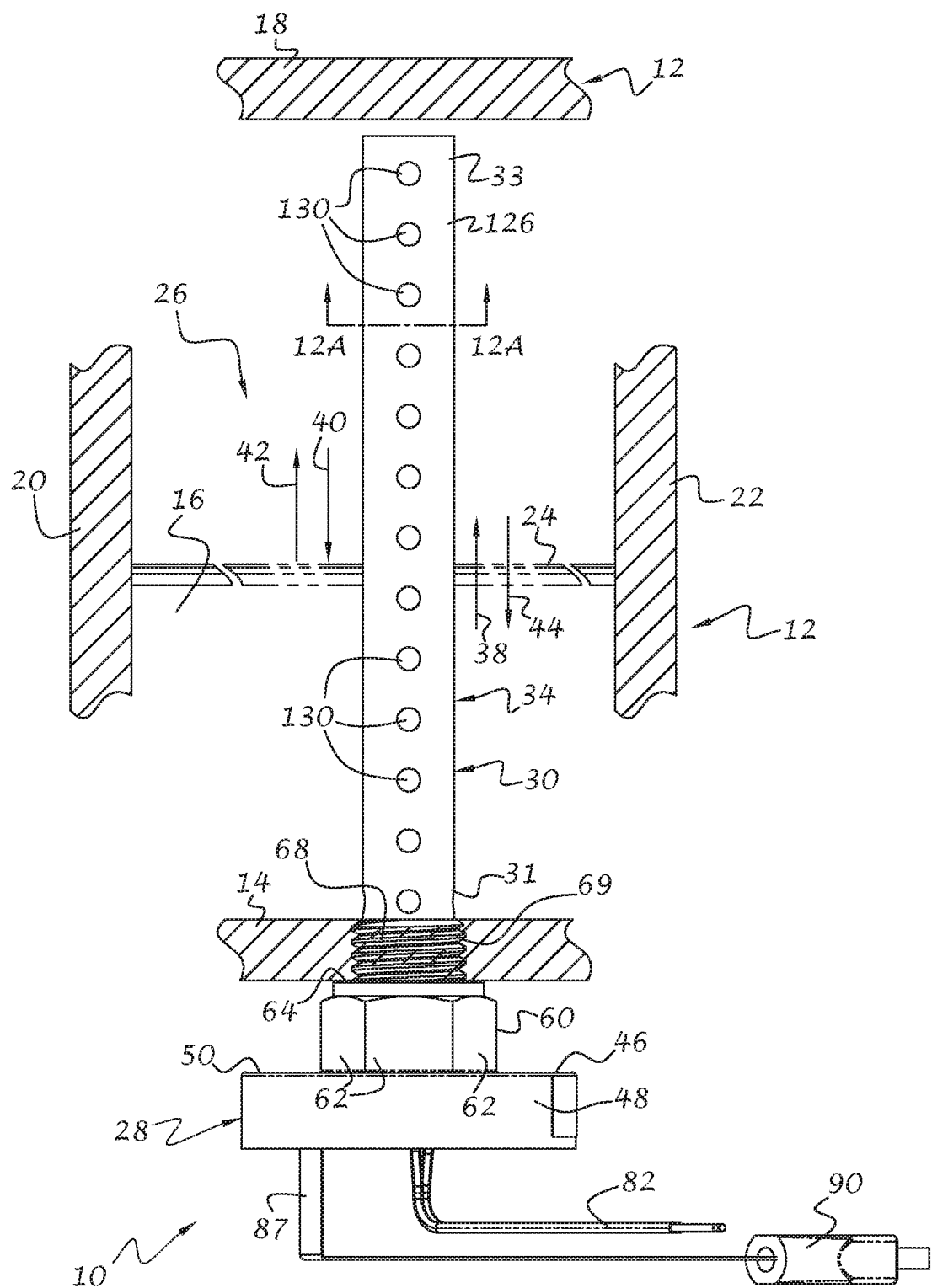
FIG. 1 is a side elevational view of a time-domain-reflectometer (TDR) transducer mounted at the bottom of a tank (a portion of which is shown cross-section) in accordance with an exemplary embodiment of the invention for measuring liquid level and other material properties.

Referring now to the drawings, and to FIG. 1 in particular, a time domain reflectometer (TDR) transducer 10 in accordance with an exemplary embodiment of the invention is illustrated. The TDR transducer 10 is shown schematically connected to a lower wall 14 of a tank 12 (schematically shown) for measuring a level or height of liquid or other material in the tank, as well as other properties of the material, as will be discussed. When precise volume of material in the tank 12 is desired, tank strapping information can be correlated with the level of material in the tank by the TDR transducer 10, to thereby determine and output volume of the material in the tank.

Figure 1A:
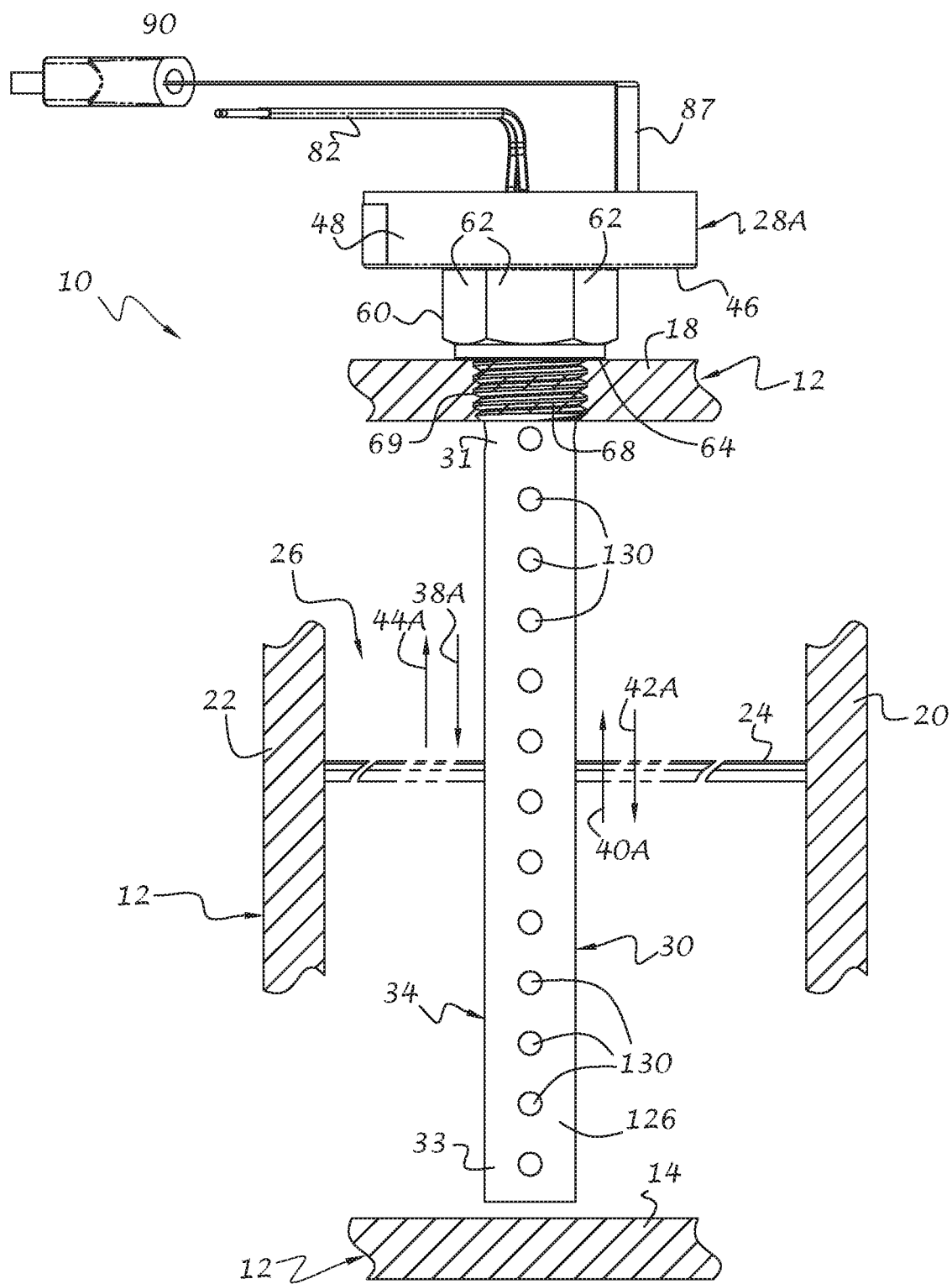
FIG. 1A is a side elevational view similar to FIG. 1 showing the TDR transducer mounted at the top of a tank in accordance with an exemplary embodiment of the invention.

The tank 12 is normally enclosed by the lower wall 14, an upper wall 18 spaced therefrom, and side walls (partially schematically represented by numerals 20 and 22) extending therebetween to form an interior space or volume 26 for holding a quantity of liquid 16 or other fluent material. An upper surface 24 of the liquid 16 demarcates an air/liquid interface, the level or position of which can be determined when the TDR transducer 10 is embodied as a TDR liquid level transducer, as shown in FIGS. 1 and 1A. The upper surface 24 of the material 16 may interface with air, vapor, one or more fluids, including gases and liquids, and so on, to fill the remaining interior volume 26 between the upper surface 24 of the material 16 and the upper wall 18 of the tank 12.

For fuel tanks and other containers holding a quantity or volume of liquid fuel, the dielectric constant of the liquid is typically much greater than the dielectric constant of the atmosphere in the interior 25 of the tank 12 above the liquid. The atmosphere above the liquid can be air, a vapor phase of the fuel or other liquid, two or more immiscible liquids having different densities, such as a fuel and water mixture, and/or oil, antifreeze, as well as various combinations thereof and/or other liquids, gases or solid particles or contaminants, located within a fuel tank, and so on. For example, in the event that some water has entered the fuel tank, the water has a greater density than the fuel, and will thus sink to the bottom of the tank, which, in some tank configurations, could be problematic since many fuel pumps and withdrawal tubes are positioned to withdraw fuel from the bottom of the tank, causing water or other higher density liquids to be withdrawn and fed to combustion engines, thereby negatively affecting their performance.

Other applications where the present invention can be effective is measuring the oil level in combustion engines, monitoring for contaminants in the oil well, such as fuel or antifreeze for example, and distinguishing between them, which may be indicative of a cracked engine block or blown head gasket. Likewise, the presence of conductive particles, such as metal particles, in the oil well of a motorized vehicle could be indicative of wear or failure of parts associated with the engine, and can be used in predicting the remaining useful life of the engine. The presence of other contaminants in the oil well can also be detected, such as soot or carbon content above a predetermined level for determining the timing of maintenance procedures such as changing the engine oil and other fluids, or cleaning agents below a predetermined level, could be indicative of the need for an oil change or other maintenance procedures.

Similarly, monitoring the level and/or dielectric constant of antifreeze in the radiator or overflow tank would be beneficial so that a user can determine, via the TDR transducer of the present invention, whether the antifreeze is properly diluted with water, whether metal particles, or other contaminants are located in the antifreeze, indicative of water pump wear or imminent failure and/or other conditions that may need attention. Likewise, since the dielectric constant changes with temperature for many liquids, the TDR transducer can also function to monitor the temperature of oil, antifreeze, other liquids being measured, and so on.

Other applications anticipated by the TDR transducer 10 of the invention include monitoring various fluids in commercial vehicles, such as the afore-mentioned fluids, as well as the level and quality of Diesel Exhaust Fluid (DEF) or Ad-Blue for diesel-powered engines, to ensure the proper ratio or acceptable range of ratios of urea to deionized water, as well as detecting the presence of sub-standard or farm-grade urea in deionized water or tap water, and so on, which could otherwise irreparably damage expensive catalytic converters that are part of Selective Catalytic Reduction (SCR) systems, thereby assuring that SCR systems associated with diesel-powered engines are properly working to substantially reduce or eliminate contaminants of combustion in the exhaust system.

Yet further applications for the TDR transducer 10 of the invention can include the quality monitoring of critical liquids or chemicals in virtually any market, including but not limited to, aviation, medical, commercial food manufacturing or food processing, dairy, semiconductor manufacturing, oil and gas production, and so on.

The TDR transducer 10 of the invention can be constructed with very long measuring probes to increase its measurement capabilities for determining the height (or depth) of waterways, canals, etc., monitoring the condition of public and private lakes, ponds, rivers, as well as the presence or absence of desirable and/or undesirable chemicals, contaminants, etc., in private wells and public water supplies, and many more applications. Accordingly, the present invention can be adapted for many applications in many different markets without departing from the spirit and scope of the invention.

The TDR transducer 10 can be associated with stationary tanks or containers 12 at fixed locations, as well as with transportable tanks or containers associated with vehicles, bobtails, or the like for measuring one or more properties of the material located within the container. The TDR transducer 10 can also or alternatively be associated with linear transducers for measuring relative position and/or displacement between two objects. The material(s) to be measured can be in gaseous, liquid, and/or solid phase(s).

With particular reference to FIGS. 1-6, the TDR transducer 10, in accordance with an exemplary embodiment of the invention, includes a mounting head 28 connected to the lower wall 14 of the tank 12 (FIG. 1), an electronic assembly 32 (FIGS. 2, 6, and 9) located in to the housing, and an elongate measuring probe 30 connected to the mounting head 28 and electrically connected to the electronic assembly 32.

The elongate measuring probe 30 includes a first elongate electrode portion 34 and a second elongate electrode portion 36 configured and mutually arranged to create an elongate inner measuring volume, space, or gap 114 (FIGS. 3-5) therebetween to allow fluid flow into and out of the measuring volume as the level of fluid in the tank changes. When the fluid is located in the measuring volume 114, the fluid height, the dielectric constant of the fluid, as well as the measurement and/or determination other fluid or material properties, as discussed herein, can be performed.

The first elongate electrode portion 34 comprises an outer generally hollow cylindrically-shaped electrode body 92 constructed of electrically conductive material. The second elongate electrode portion 36 comprises an inner generally rectangular-shaped electrode body in the form of a PCB 94 constructed of superimposed alternating conductive and insulative layers to form a first elongate shielded electrode section 36A (shown in hidden line in FIG. 6) that is electrically isolated from the first or outer electrode portion 34, and a second elongate unshielded electrode section 36B (shown in hidden line in FIG. 6), and shown schematically separated by an elongate centerline 55 offset from the centerline 112 of the elongate measuring probe 30, that is separated from the outer electrode portion 34 by the measuring volume 114, as will be described in greater detail below.

The second elongate electrode portion 36 is configured to be generally centered within, and surrounded by, the first elongate electrode portion 34 to form a generally coaxial elongate measuring probe 30, with both the first elongate electrode portion 34 and second elongate electrode portion 36 electrically and mechanically connected to the mounting head 28. As shown in FIG. 1, the elongate measuring probe extends upwardly into the tank 12 from the lower wall 14 thereof. Likewise, the elongate measuring probe 30, as shown in FIG. 1A, extends downwardly into the tank from the upper wall 18 thereof. The inner elongate measuring volume 114 between the outer electrode portion 34 and inner electrode portion 36 is adapted to receive fluids in liquid and/or gas phases, as well as fluent materials, such as grain or feed. In this manner, the level of liquid within a tank, the level of grain within a granary or silo, the level of chemicals, foods, mixtures, and the like in large holding tanks, as the present invention is capable of high accuracy measurements over long distances when compared to prior art transducers.

The electronic assembly 32 is located in the mounting head 28 and electrically connected to the outer and inner electrode portions for generating one or more pulses of electromagnetic energy, and preferably a succession of many energy pulses of increasing duration, and propagating or transmitting the pulses along the measuring probe 30, including the first shielded electrode section 36A (shown in hidden line in FIG. 6) that is isolated or shielded from the first or outer electrode portion 34 to thereby create a first elongate transmission line segment of a guided wave radar (GWR) system, and the second unshielded electrode section 36B (shown in hidden line in FIG. 6) in conjunction with the outer electrode portion 34 of the second unshielded electrode section to thereby form a second elongate transmission line segment of the GWR system. The first and second elongate transmission line segments of the invention are much more efficient than radar measurement systems that propagate the radar signal through air only, i.e. without the wave being guided by one or more conductors along a predetermined path.

The present invention is uniquely situated to measure the level of many different liquids or other flowable materials having a wide variety of different dielectric constants along the second unshielded transmission line segment, via time domain reflectometry (TDR), while the first shielded electrode section 36A ensures that the pulse remains electrically isolated or shielded from the first elongate electrode portion 34, and thus the material being measured, to preserve the integrity of each energy pulse and/or each return echo, depending on the probe orientation and the direction of the wave propagation, as will be described in greater detail below.

The inner electrode portion 36 and outer electrode portion 34 together with the electronic assembly 32 and any material located therebetween, enable the generation and propagation of one or more pulses of electromagnetic energy along the length of the probe 30 and reception of one or more return echoes when an anomaly or discontinuity occurs, due to a localized change in the impedance of the probe 30 at the point or location of the anomaly or discontinuity, such as at the air/liquid interface within a tank, and/or one or more predetermined locations along the probe 30 where one or more preconfigured anomalies have been purposefully created for calibrating the probe 30, for example. Predefined anomalies can include any change in configuration to one or more electrodes such as a localized increase or decrease in surface area of the electrodes, the space between electrodes, the introduction of different materials or components having different dielectric constants to change the local impedance, any coating on the electrodes, and so on. When a generated signal propagates along the elongate measuring probe 30, a return echo from the energy pulse is generated at the or each predefined or naturally occurring anomaly to calibrate the TDR transducer, locate the position of the air/liquid interface, or other desired material property where a change in impedance occurs.

Accordingly, the change in impedance of the elongate measuring probe 30 at the precise air/liquid interface within the inner elongate measuring volume 114 between the outer electrode portion 34 and inner electrode portion 36, causes generation of the return echo, which travels back along the elongate measuring probe 30 until reaching the electronic assembly where the time delay between generation of the signal and reception of the return echo is determined. The time delay can then be used to find, with high accuracy, the distance to the air/liquid interface, and thus the level of liquid within the tank and other properties. The time delay can also be used to determine the measured distance between the proximal end of the probe 30 and a predefined anomaly, the distance between two or more predefined anomalies, and so on, as previously described, to thereby dynamically calibrate the TDR transducer during the measuring cycle.

As will be described in greater detail below, the inner electrode portion 36 of the elongate measuring probe 30 includes strategically located conductive and insulative features to form the first elongate shielded electrode section 36A (shown in hidden line in FIG. 6) electrically connected to the electronic assembly 32 in the mounting head 28 and extending along a length of the inner electrode portion 36 between the proximal end 37 and distal end 39 thereof, and the second unshielded electrode section 36B (shown in hidden line in FIG. 6) connected to the first shielded electrode section at the distal end 39 of the inner electrode 30 and extending toward the proximal end 37 thereof. The first and second shielded and unshielded electrode sections 36A and 36B, respectively, extend generally parallel to each other along the length of the inner electrode portion 36. As will be described in greater detail below, the first shielded electrode section 36A receives a signal in the form of an electromagnetic energy pulse, such as a radio frequency (RF) energy pulse or the like at a proximal end 37 of the inner electrode 36, which is generated by the electronic assembly, and is guided toward the distal end 39 of the inner electrode 36 by the first shielded electrode section 36A independent of changes in probe impedance, including liquids or other materials that may have relatively high dielectric constants that would otherwise render ineffective or inoperative prior art TDR transducers. Upon reaching the distal end 39, the RF pulse is then guided back toward the proximal end 37 by a combination of the unshielded electrode section 36B and the outer electrode portion 34, where it is exposed to liquid, air, and/or other materials located in the inner measuring volume 114 (FIG. 4) between the electrodes 34 and 36.

The first shielded electrode section 36A also extends through a portion of the mounting head 28 to isolate the electromagnetic energy pulse from undesirable anomalies that could otherwise occur at the transition between the outer electrode portion 34 and the mounting head, the presence of supporting structure (such as space 150 shown in FIG. 4) between the outer electrode portion 34 and inner electrode portion 36, and so on, that would cause a change the localized impedance, as well as undesirable anomalies through a substantial length of the measuring probe so that the energy pulse is at least substantially unaffected by tolerance variations or material changes in the elongate measuring probe 30, the presence of liquids or other materials with relatively high dielectric constants in the tank for measurement by the probe. This unique feature of the invention is superior over prior art TDR transducers, since exposure of the electromagnetic energy pulse of prior art transducers to liquids or other materials with relatively high dielectric confidence would cause to the energy pulse to effectively dissipate before reaching the desired interface, e.g. the air/liquid interface, etc., and thus fail to generate a return echo of sufficient amplitude at the interface to measure with any degree of confidence.

Accordingly, the provision of an electrically shielded electrode section 36A ensures that the energy pulse propagates through high dielectric materials and any undesirable anomalies that would otherwise significantly change the impedance of the elongate measuring probe 30 between the inner and outer electrodes, resulting in either false return echoes or substantial dissipation of the energy pulse into the material in the tank being measured, thereby failing to create a return echo with sufficient amplitude to adequately or reliably measure, as described above. Accordingly, the present invention has many advantages over the prior art. For example, relatively loose manufacturing tolerances can be specified, lower-cost components can be utilized, quicker assembly time can occur, and allowances for deviations in fluids or materials to be measured, deviations in the probe or tank construction can be tolerated, and thus allow operation of the TDR transducer of the invention where prior art TDR transducers would be rendered inoperative.

Moreover, the laborious design and assembly processes required to achieve an approximate equal impedance value at any position along the length of the elongate measuring probe in an attempt to eliminate undesirable return echoes that would otherwise occur due to impedance changes at any particular location along the probe, taking into consideration the critical connection areas between the probe and the mounting head, as well as the dielectric constants and geometries of such components, can be substantially reduced or eliminated by the present invention, since changes in impedance of the TDR transducer do not affect the propagation of the energy pulse through the shielded electrode section 36A of the measuring probe 30. In contrast, propagation of the energy pulse along the second unshielded electrode section 36B of the measuring probe ensures that sensitivity to changes in impedance at critical measurement locations along the elongate measuring probe 30 in a second propagation direction, generally opposite to the first propagation direction, occurs.

By way of example, if the first shielded propagation direction of the pulse is upward (first direction) from the proximal end of the probe to the distal end thereof through the shielded electrode portion 36A (FIG. 6), as shown in FIG. 1 for example, then the second unshielded propagation direction of the pulse through the unshielded electrode portion 36B (FIG. 6) turns downward (second direction) as the pulse crosses from the shielded electrode section 36A to the unshielded electrode section 36B to thereby cause a first boomerang effect, and propagates from the distal end of the probe to the proximal end thereof through the air or atmosphere 26 above the upper surface or level 24 of the material 16 in the tank. In this manner, little or no energy is lost through the shielded propagation direction, while a relatively small amount of energy may be lost or dissipated along the unshielded propagation direction through the unshielded electrode section 36B of the elongate measuring probe 30. When the pulse is radiating across the inner measuring volume 114 between the outer electrode 34 and unshielded electrode section 36B and propagating in the second direction, a portion of the pulse will be reflected at the air/liquid interface, thereby generating a return echo, which propagates along the unshielded electrode section while radiating between the unshielded electrode section 36B and the outer electrode portion 34 of the measuring probe in an upward direction (third propagation direction) opposite the second propagation direction, and then downward (fourth propagation direction) through the shielded electrode section 34A as the return echo crosses from the unshielded electrode section 36A to the shielded electrode section 34A of the probe, thus ensuring that no signal loss occurs through the shielded electrode section until the return echo reaches the electronic assembly 32.

Upon arrival of the return echo, a precision clock, crystal, or timer associated with the microprocessor of the electronic assembly 32 is used to determine the time difference, or delta time, between the commencement of the RF pulse propagation and arrival of the resultant return echo is measured with high precision and confidence. With the delta time known, the time to the air/liquid interface can be used to determine the actual distance between the electronic assembly and the air/liquid interface, to thereby calculate the level or height of liquid or other material in the tank with a high degree of accuracy, since the velocity of the electromagnetic pulse through the probe is known. The volume of liquid or other material in the tank can also be determined based on strapping information correlating liquid level in the tank with the tank geometry. Other properties that can be determined include the density of the liquid at the measurement temperature, the actual dielectric constant of the liquid at the ambient temperature with the measuring probe, as well as other material properties.

In this manner, the electromagnetic energy pulse travels virtually unimpeded in the first propagation direction along the first shielded electrode section 36A of the elongate measuring probe to reduce or eliminate loss of energy at undesirable locations, while allowing the generation of a return echo at the air/liquid interface (or other predefined anomaly in the unshielded section causing a predetermined characteristic return echo for calibration purposes for example) so that generation of a return echo associated with the unshielded electrode section of the elongate measuring probe occurs only at the air/liquid interface, as well as at other predetermined or preconfigured anomaly positions, thereby measure or otherwise determine the material height, volume, dielectric constant k of the material within the tank, density, temperature, as well as other material properties, such materials including, but not limited to different material phases such as liquids, solids, semi-solids, gases, fluent materials, one or more interfaces between immiscible fluids, and so on, at any temperature within the operating range of the TDR transducer.

As described herein, it will become apparent that the present invention is particularly advantageous for use with tanks or containers with bottom-mount liquid level transducer configurations, especially since the coaxial probes of prior art TDR transducers are not able to generate a reliable return echo at the liquid/air interface, as a significant amount of the pulse energy in such prior art devices dissipate into the liquid in the tank, and more especially for liquids with relatively high dielectric constants. In contrast, the TDR transducer in accordance with the invention, as well as various modifications and embodiments described herein, is well-adapted for tank installation at a variety of different orientations thereby accommodating practically any tank mounting configuration and geometry.

With reference now to FIG. 1A, a TDR transducer 10A in accordance with a further embodiment of the invention is illustrated. The transducer 10A is similar in construction to the transducer 10, and is also well-adapted for mounting in any suitable orientation with respect to a tank for measuring the properties of the material within the tank interior. Accordingly, and by way of example, the TDR transducer 10A is shown installed in an upright orientation, with the mounting head 28A of the transducer 10A having NPT male threads for connection to a similarly sized NPT female threaded opening formed in the upper wall 18 of the tank 12. A volume of liquid or other material 16 can be located in the inner volume or space 25 of the tank 12, with the level or height of the upper surface 24 of the material 16 can be measured by the TDR transducer 10A, as well as other material properties, in a similar manner as the TDR transducer 10. With the mounting head 28A of the TDR transducer 10A connected to the upper wall 18 of the tank 12, the elongate measuring probe 30, whether constructed of flexible or stiff materials, extends into the interior space 25 of the tank from the mounting head 28A for determining liquid level, the dielectric constant of the liquid, and/or the quality or composition of the liquid, and so on, as will be described in greater detail below.

With particular reference to FIGS. 2-6 and 10, the electronic assembly 32 preferably includes electronic components 41 mounted on a first or primary multi-layered printed circuit board (PCB) 35 located in the mounting head 28 or 28A with plated through-holes, blind vias, and so on, for interconnecting respective conductive traces and ground planes, associated with each layer, as well as mounting pads and/or plated hole patterns for mounting various electronic components 41 that may be surface-mounted and/or through-hole mounted.

At least one elongate transmission line comprising a conductive calibration trace 43 (FIG. 10) extends across one or more of the outer or inner layers of the PCB 35 to calibrate the TDR transducer 10, since the length of the calibration trace 43 is known. The electronic assembly 32 is connected to the elongate measuring probe 30, which includes the outer elongate electrode portion 34 and the inner elongate electrode portion 36. The outer electrode portion 34 and inner electrode portion 36 together with the electronic assembly 32, including the calibration trace 43, enable means for the generation and propagation of a large number of electromagnetic energy pulses in quick succession along the conductive calibration trace 43 and the elongate measuring probe 30, with each successive energy pulse having a slightly longer duration than the previous, until the end of the measuring probe 30 has been reached. A reflection wave or return echo is generated when an anomaly is encountered as previously discussed, such anomaly having a difference in impedance sufficiently large to generate the return echo, which may be indicative of the air/liquid interface representative of liquid level and/or other anomalies.

Further details of the electronic assembly 32, including the PCB 35 and various electronic circuitry means for generating and transmitting electromagnetic energy pulses along a transmission line, receiving reflected waves or return echoes, analyzing the time between transmission and reception, and so on, can be found in the above-referenced copending U.S. application Ser. No. 16/173,993 filed on Oct. 29, 2018, the disclosure of which is hereby incorporated by reference in its entirety.

Figure 6:
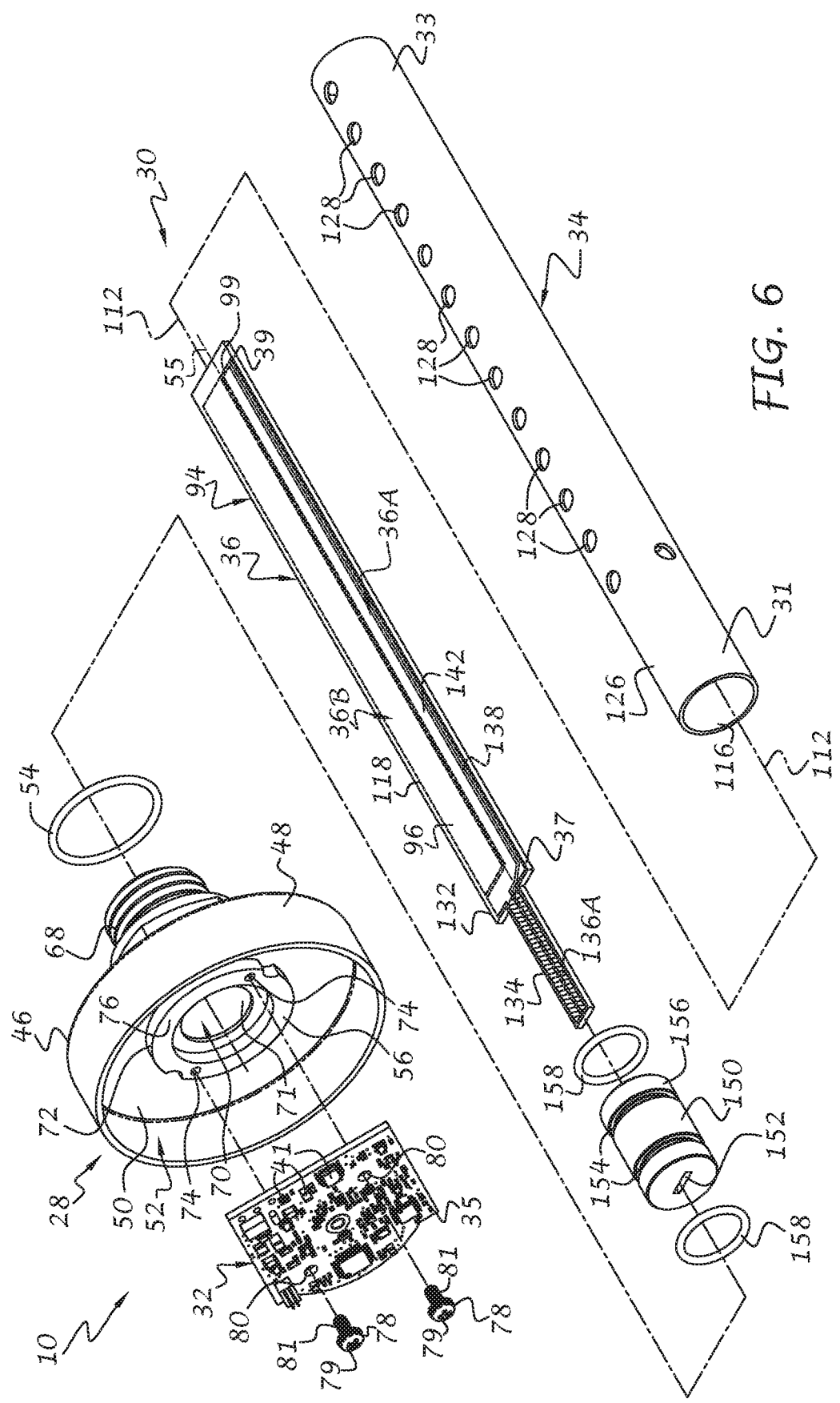
FIG. 6 is a bottom left side isometric exploded view of the TDR transducer showing a mounting head connectable to an elongate measuring probe having an outer elongate cylindrically-shaped electrode portion and an inner electrode portion with shielded and unshielded electrode sections (as represented by a centerline and hidden lines representing inner conductor layers), associated with the second elongate electrode portion of the elongate measuring probe.

The particular construction of the inner electrode portion 36, as will be described in greater detail below, enables the generated energy pulse to propagate upwardly within the inner electrode portion 36 along the elongate measuring probe 30 in from a proximal end 31 to a distal end 33 thereof in a first propagation direction, as represented by arrow 38 in FIG. 1 for example, or propagate downwardly, as represented by arrow 38A in FIG. 1A. While propagating along the probe in the first propagation direction, the inner electrode portion 36 is constructed with the shielded electrode section 36A (FIG. 6), which serves as a first shielded transmission line segment, such that the energy pulse is confined therein, thereby bypassing the outer electrode portion 34 when the pulse travels in the first propagation direction, to ensure that little or no signal loss occurs, yet restores contact between the outer electrode portion 34 and inner electrode portion 36 with the unshielded electrode section 36B (FIG. 6) connected to the shielded electrode section 36A at the terminal or distal end thereof, and travel in a second propagation direction, as represented by arrow 40 in FIG. 1 or arrow 40A in FIG. 1A, opposite the first propagation direction, thus causing the energy pulse to "boomerang" from the shielded electrode section 36A to the unshielded electrode section 36B (FIG. 6). The outer electrode portion 34 together with the unshielded electrode section 36B, which together serve as a second unshielded transmission line segment, so that the energy pulse is exposed to the volume of liquid, air, or other materials located between the electrodes. This is advantageous over prior art devices, since the energy pulse is initially shielded from the liquid or other material being measured, to thereby accommodate liquids and other materials with dielectric constants that are sufficiently high to otherwise cause significant loss or dissipation of the electromagnetic pulse through the liquid being measured, especially when the TDR transducer is mounted to the lower wall of a tank or container and the liquid or other material being measured has a relatively high dielectric constant. Significant loss or dissipation of the energy pulse may result in the failure to generate a return echo of sufficient amplitude to be detected with a high level of confidence. Accordingly, the shielded energy pulse functions independently and unrestricted with respect to the type of liquid or other material being measured, including liquids with high dielectric constants.

In the reverse direction, the energy pulse propagates downwardly from the distal end 33 of the probe 30 between the unshielded section 36B of the inner electrode portion 36 and the outer electrode portion 34, as represented by arrow 40 in FIG. 1, (or in the case of FIG. 1A, the energy pulse propagates upwardly from the distal end 33, as represented by arrow 40A), until it reaches the upper surface 24 of the liquid between the inner electrode portion 36 and outer electrode portion 36, since at this point the inner electrode assembly is unshielded, which interfaces with the air or atmosphere 24 above the liquid and between the electrodes, whereupon a return echo will be generated, and reverse course with respect to the direction of the electromagnetic pulse along the probe 30, as represented by arrow 42 in FIG. 1 (or in the case of FIG. 1A, the return echo is generated at the liquid/air interface and returns downwardly along the probe 30, as represented by arrow 42A), until the distal end 33 of the probe is reached, then reverse direction again or "boomerang" downwardly in the shielded section 36A, as represented by arrow 44 in FIG. 1 (or in the case of FIG. 1A, propagate upwardly in the shielded section as represented by arrow 44A), to again prevent signal degradation or loss of the return echo, where it is received by a receiver associated with the electronic assembly 32 at the proximal end of the transducer 10 (or 10A in FIG. 1A) for analysis and determination of the location, height, and/or position of the liquid/air interface 24 and/or other anomalies.

Accordingly, the elongate measuring probe 30 serves as a boomerang waveguide with a first shielded transmission line segment and a second unshielded transmission line segment in a guided wave radar (GWR) measuring system when the electromagnetic energy pulse comprises one or more suitable wavelengths or frequencies, such as found in the radio band of the electromagnetic spectrum.

It will be understood that the term "pulse" as used herein refers to a signal with a distinguishable burst, ramp, wave, or other change in electromagnetic energy, such as a change in amplitude or frequency of a signal imposed on a waveguide or transmission line of the TDR transducer 10 or 10A. For purposes of the present invention, the pulse can be a signal with a ramp-up of energy from a first value, such as a baseline value to a higher second value, with or without a ramp-down to the first value or other lower value. Likewise, the pulse can be a signal with a ramp-down of energy from a first value, such as a baseline value, to a lower second value, with or without a ramp-up to the first value or other higher value. Since the propagation of electromagnetic energy will occur at or near the speed of light when air is present between the outer electrode portion 34 and the inner electrode portion 36 of the elongate measuring probe 30, and perhaps half of that velocity in the presence of materials to be measured (depending on the dielectric constants of the materials), in order to increase efficiency, allow the use of low-cost components, and simpler algorithms for control of the transmission and reception of the electromagnetic pulse, the wave or pulse of electromagnetic energy ramps up (or down) and does not return to the baseline value until reaching the end of the unshielded electrode section 36B of the elongate measuring probe 30 in preparation for a new measurement.

Accordingly, when an electromagnetic energy pulse, burst, ramp, etc. reaches an anomaly at a particular position of the elongate measuring probe sufficient to create a change in the nominal impedance value of the probe at that position, a portion of the electromagnetic energy pulse is reflected back along the waveguide or transmission line to the electronic assembly as a return echo, as represented by arrow 42, as previously described. Characteristics of the return echo depend largely on the type of anomaly, but are generally proportional change in impedance at the particular anomaly location.

When the return echo is received, it is stored in memory and analyzed by the electronic assembly 32 to ultimately determine the location along the probe 30 where one or more anomalies has occurred or is occurring. The location can represent, for example, the level of liquid in a tank or container, i.e. the air/liquid interface location, the interface location between two liquids, a liquid/solid interface location. Other exemplary measurements within the purview of the invention include, but are not limited to, the level of granular material within a storage silo, the position of a rod or plunger with respect to a stationary support, the location of predefined anomalies (such as apertures, thinner or thicker areas, spacers or supports at certain positions associated with the elongate measuring probe 30, as well as anomalies that may occur at one or more locations along the elongate measuring probe, such as film build-up on the measuring surfaces, contaminant deposits, the location of foreign material within the probe 30, and so on. Accordingly, it is within the scope of the invention to determine the location of any anomaly so long as a sufficient change in the impedance at the anomaly position along the probe occurs.

The speed or velocity at which the electromagnetic energy pulse travels through the liquid, solid or gaseous state of different materials can also be recorded and analyzed to determine other properties of the material being measured between the elongate electrodes, such as the dielectric constant, which may change due to temperature fluctuations, the introduction of more than one fluid, liquid or material into the tank or container, and so on. When the electromagnetic energy pulse or burst comprises a radar signal, the velocity at which the energy pulse travels through air approaches the speed of light. Depending on the dielectric constant of various materials, the velocity can be slowed to less than half the speed of light. Accordingly, the dielectric constant can be continuously monitored to determine changes to the liquid or material being measured and thus corrections to the calculated height of the liquid/air interface or the like, since the velocity of the energy pulse through the material to be measured can vary due to temperature fluctuations of the ambient air, liquid, and other material through which the energy pulse travels.

With particular reference to FIGS. 2-6, the mounting head 28 and mounting head 28A are similar in construction, and therefore the description on one applies to the other. The mounting head 28 includes a housing 46 with a circular side wall 48 and an upper wall 50 that define an interior space or volume 52 for receiving the electronic assembly 32. The housing 46 can be constructed of any suitable material including, but not limited to, metals such as aluminum, stainless steel, titanium, and so on, plastics, ceramics, composites, elastomers, combinations thereof, etc. In accordance with a preferred embodiment of the invention, the housing 46 comprises an electrically conductive material, such as aluminum or stainless steel, for electrically connecting to the elongate measuring probe 30. Potting material (not shown) can fill the interior space 52 after installation of the electronic assembly 32 to thereby seal the electronic assembly from the environment.

The housing 46 further includes a first mounting portion 56 that extends downwardly from the upper wall 50 outside of the tank or container 12 for mounting the transducer 10 to a tank or container 12 (FIG. 1), and a second mounting portion 58 that extends downwardly from the upper wall 50 and into the interior space 52 for mounting the electronic assembly 32. The first and second mounting portions 56, 58 of the housing 46 are preferably integrally formed as a single unit along with the circular side wall 48 and the upper wall 50 during manufacturing. However, it will be understood that the various components of the mounting head 28 can be formed separately and connected together using well-known connecting means without departing from the spirit and scope of the invention.

The first mounting portion 56 includes a first wall section 60 with a plurality of flat surfaces 62 formed thereon for engagement with a wrench or other tool during installation of the transducer 10 to the tank 12. The first wall section 60 includes an upper surface 64 (FIGS. 4 and 5) adapted for contacting the lower wall 14 or other surface of a container 12 (FIG. 1) when connected thereto. An annular groove 66 (FIGS. 4 and 5) is formed in the upper surface 64 for receiving an O-ring 54 or the like to seal the mounting head 28 against the container wall when tightened. The first mounting portion 56 also includes a threaded connecting section 68 that engages a threaded opening 70 (FIG. 1) formed in the lower wall 14 of the tank 12 to thereby securely mount the transducer 10 to the tank 12.

It will be understood that the first mounting portion 56 of the housing 46 can greatly vary without departing from the spirit and scope of the invention. For example, many tanks have either a straight-threaded opening or NPT-threaded opening for receiving a liquid level transducer or the like. The type of threaded opening depends on the material or liquid stored in the tank, and in order to accommodate such arrangements, the corresponding threaded connecting section 68 can be provided with the appropriate thread type for mating with the tank opening. In addition, many tanks do not have threaded openings but rather threaded mounting studs or the like that surround the tank opening. Accordingly, the first mounting portion 56 of the housing 46 can be provided with a flange (not shown), such as a 4-hole flange or 5-hole flange as previously described, with aligned holes for receiving the threaded studs so that the transducer 10, 10A can be mounted to the wall of the tank and secured thereto with a corresponding number of threaded nuts in a well-known manner. Other known means for connecting the transducer to a tank, container, wall, or the like can also be used without departing from the spirit and scope of the invention.

As shown in FIGS. 4-6, a central bore 70 extends through the first mounting portion 56 and upper wall 50 of the housing 46 and includes an inner annular surface 71 for receiving the proximal or lower end 31 of the elongate measuring probe 30. The second mounting portion 58 of the housing 46 includes an annular side wall or boss 72 that extends downwardly from the upper wall 50 and surrounds the central bore 70. Mounting apertures 74 are formed in a bottom surface 76 of the annular boss or side wall 72 and are adapted to receive fasteners 78, such as self-threading fasteners having a fastener head 79 and a threaded shank 81 extending therefrom. The shank 81 extends through plated openings 80 of the first, or primary, PCB 35 with the head 79 in contact with the PCB 35 for electrically and mechanically connecting the electronic assembly 32 to the mounting head 28.

The housing 46, including the upper wall 50 and inner annular surface 71, are constructed of electrically conductive material so that the outer electrode portion 34 of the probe 30 and the electronic assembly 32 are electrically connected together. Preferably, the housing 46, the outer electrode portion 34, and a first portion of the electronic assembly 32 are connected to ground, while the inner electrode portion 36 is connected to a second portion of the electronic assembly 32 that produces the electromagnetic energy pulse and detects return echoes traveling back along the probe 30. With the outer electrode portion 34 of the elongate measuring probe 30 being electrically connected to the inner annular surface 71 of the housing 46, the first mounting portion 56 of the housing 28 becomes a longitudinal extension of the elongate measuring probe 30.

Figure 2:
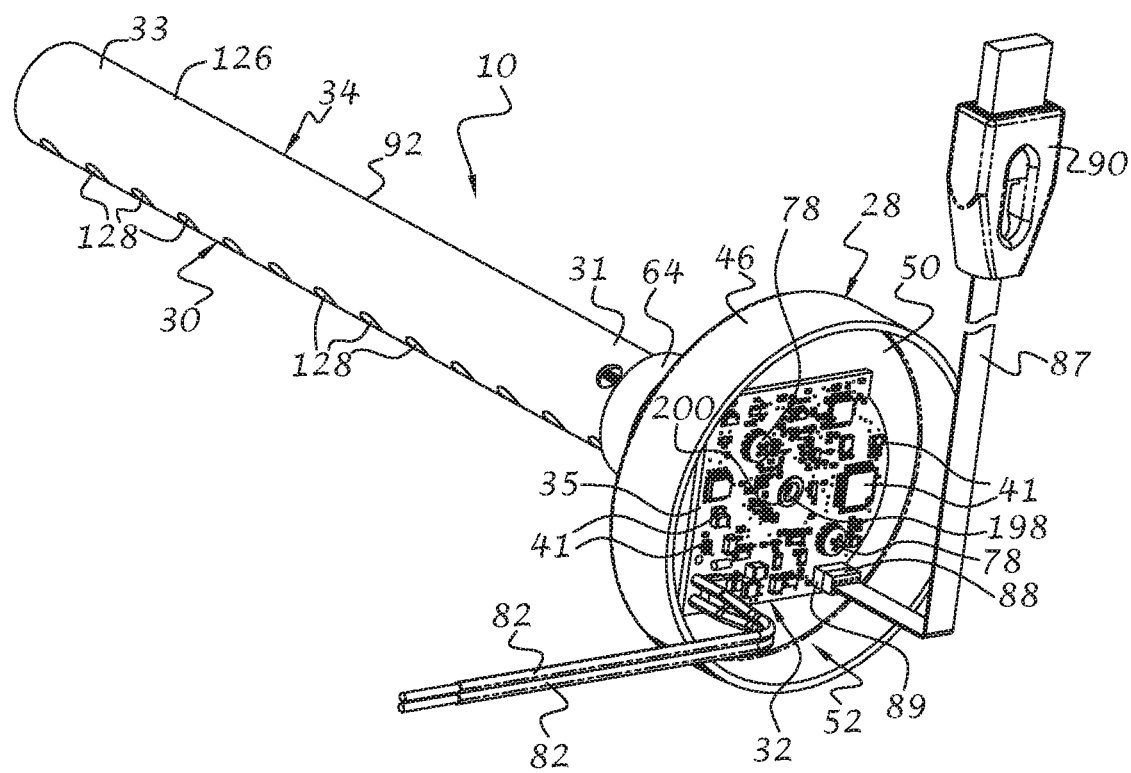
FIG. 2 is a bottom right side isometric view of the TDR transducer of FIG. 1 and showing a housing for connection to a tank or the like and an elongate measuring probe for extending from the housing and into the tank.

As best shown in FIG. 2, the interior space 52 is of sufficient size for receiving the primary PCB 35 of the electronic assembly 32. A first pair of wires 82, 84 extends from the PCB 35 for supplying power and ground to the electronic assembly 32 from a power source, such as a battery, vehicle power, line power, and so on. A wiring harness 86 can be connected to the PCB 35 and includes a plurality of conductors (not shown) protected by a sheath 87, a first plug 88 that connects with a corresponding second plug 89 or other connection means on the PCB 35, and an outer free end with a terminal 90 for connection to a display, computer, further processing electronics, and so on, for displaying and/or processing the return echoes and adjusting or updating software stored in memory of the electronic assembly 32. The terminal 90 is adapted for connection to a mating plug or receptacle, respectively (not shown) associated with a vehicle, tank, system, or machine (not shown) for providing signals to a remote location indicative of one or more measured properties of the material being measured by the elongate measuring probe 30, as determined by the electronic assembly 32.

The transmission of signals related to the measured properties can be via the wiring harness 86 to a hard-wired display (not shown) associated with the transducer, vehicle, machine, system, etc. Signals can also, or alternatively, be sent wirelessly via a radio-frequency (RF) transceiver (not shown) to an independent external display (not shown) associated with a vehicle, machine, system, a portable device such as a smartphone, tablet, computer, and so on, in a well-known manner. The signals can be indicative of one or more conditions inside the tank or container 12 (FIG. 1) as previously described, including liquid level, material level, the level between two or more suspended liquids, specific gravity, liquid or material type, vapor space, temperature, pressure, density, and so on, ambient conditions outside of the tank such as temperature, humidity, atmospheric pressure, vehicle tilt, and so on, as well as other conditions and/or measurements.

Although discussion of the present invention is predominantly related to liquid level measurement within a tank and associated properties of the liquid being measured, such as its dielectric constant, it will be understood that the level, volume, density, dielectric constant, and/or other properties of virtually any material, whether in solid, liquid, gaseous and/or vapor state(s), can be measured and/or determined by the invention, and therefore the exemplary applications of determining liquid level and dielectric constant are not to be construed in any limiting sense.

Moreover, although separate conductors are shown for providing power, ground, and signal, for transmitting information related to the TDR transducer 10, it will be understood that the TDR transducer 10 can comprise more or less electrical wires or conductors depending on the information transmitted and the remote device, machine, or system that receives, processes, and/or displays the information of the material within the tank.

Referring now to FIGS. 4-7, the elongate measuring probe 30, in accordance with an exemplary embodiment of the invention, comprises a first shielded transmission line segment 215 (FIG. 12A) having the first shielded electrode section 36A in a generally coaxial configuration, and a second unshielded transmission line segment 217 (FIG. 12B) having the outer electrode portion 34, the second unshielded electrode section 36B that is generally coaxial therewith, and the measuring volume 114 located between the unshielded electrode section 36B and the inner conductive surface 116 of the outer electrode portion 34. The second unshielded transmission line segment is offset from the first shielded transmission line segment. As shown, the outer elongate electrode portion 34 comprises an outer hollow electrically conductive body 92, configured as a hollow cylinder, tube, or the like, while the inner electrode portion 36 comprises a rectangular-shaped PCB 94 with both the shielded and unshielded electrode sections associated therewith.

It will be understood that the elongate measuring probe 30, including the electrodes, are not limited to coaxial arrangements or particular shapes, but can be of any suitable shape, size, or configuration, with the electrodes spaced at any suitable distance so long as one or more properties and/or conditions of the liquid or other material or medium located in a measuring volume between the electrodes can be measured and/or determined utilizing the system and/or method(s) of the present invention, including the shielded and unshielded transmission line segments of the probe 30.

Figure 7:
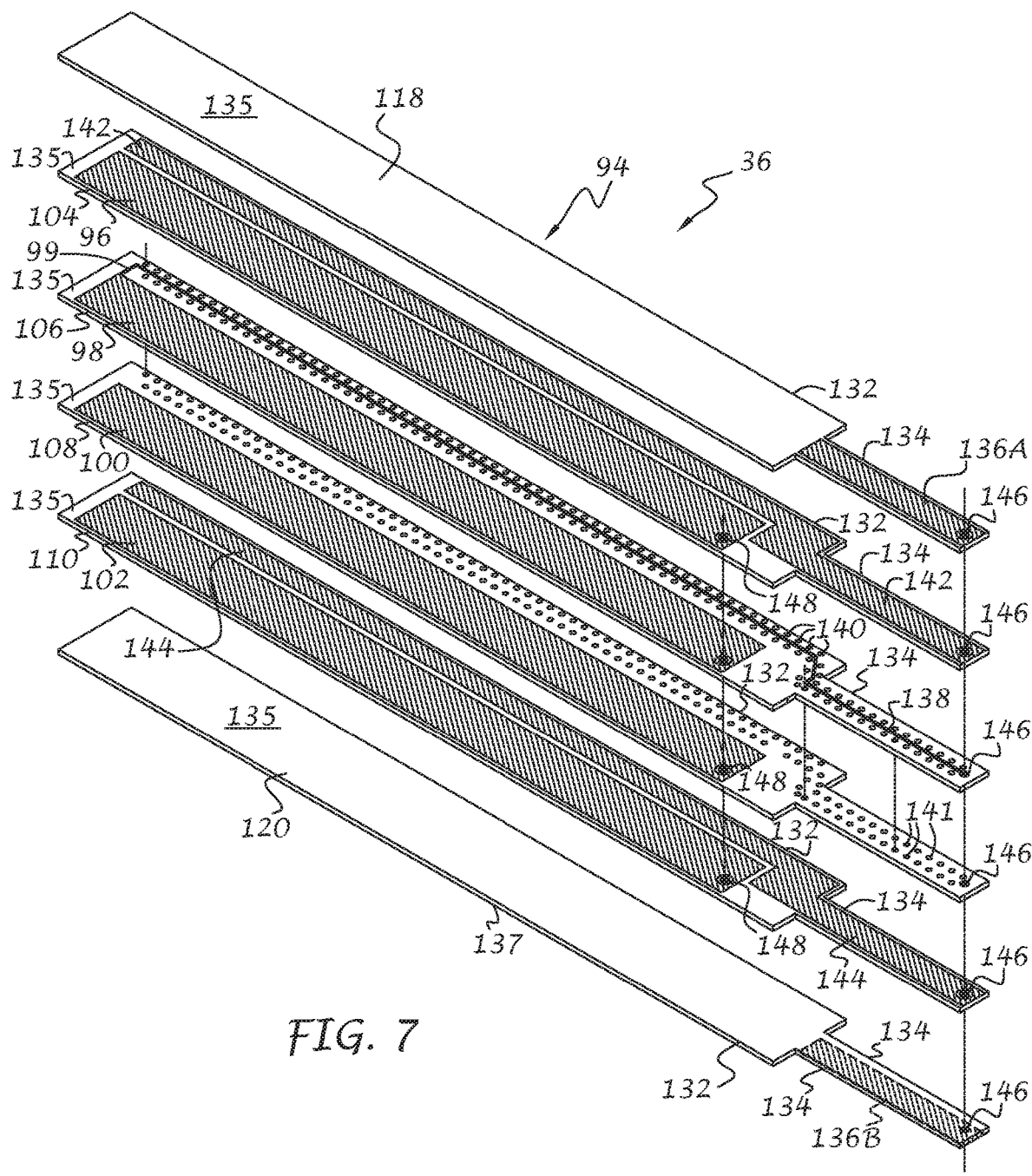
FIG. 7 is an exploded isometric bottom view of the second electrode portion with a plurality of insulative substrate layers bonded together to form a multi-layer PCB with a shielded elongate trace, aligned unshielded electrodes, and aligned ground planes formed internally on a first face or surface associated with each substrate layer for propagating the signal and any return echoes therealong in accordance with an exemplary embodiment of the invention.

As best shown in FIG. 7, the inner electrode body 94 of the inner electrode portion 36 comprises a multilayer PCB 94 with a plurality of insulative substrate layers 118, 104, 106, 108, 110, and 120, and conductive layers 142, 96, 138, 98, 100, 144, and 102 formed on or between the substrate layers. The conductive layers can include one or more signal traces and planes, ground planes, and where needed, one or more power planes when at least a portion of the electronic assembly 32 is associated with the PCB 94.

The conductive layers include a conductive signal trace 138 with at least one, and preferably a plurality of, electrically and mechanically interconnected conductive signal planes, areas or traces 96, 98, 100, and 102. The conductive layers also include at least one, and preferably a plurality of, electrically and mechanically interconnected conductive ground planes, areas, or traces 142, 144 that are insulated from the signal planes. The conductive signal trace 138 and conductive signal planes 96, 98, 100, and 102 are formed on different substrate layers 104, 106, 108, and 110, respectively. Likewise, the conductive ground planes are formed on substrate layers 104, and 110. The substrate layers are bonded together with the conductive layers therebetween using known manufacturing techniques so that the conductive layers are located within the multilayer PCB 94. However, it will be understood that one or more of the conductive layers can be located on the outside layer(s) of the PCB 94 and may be directly exposed to the liquid or other material to be measured or insulated therefrom through a thin coating without departing form the spirit and scope of the invention.

The conductive signal trace 138 comprises a narrow elongate conductor that is electrically connected at one end to PCB 35 of the electronic assembly 32. Likewise, the signal planes 96, 98, 100, and 102 as shown, comprise superimposed rectangular plates or strips, each having a predetermined area that, when combined with the other signal plates or strips, create a relatively large electrode area. The relatively large electrode area together with the outer conductive body 92 of the first electrode portion 34 and the inner measuring volume 114 (FIG. 4) and one or more of the insulative substrate layers of known thickness and material, and thus known properties of the substrate material, including the dielectric constant, along with the dielectric constant of air or the like within the otherwise empty measuring volume 114 void of the material to be measured, define a nominal impedance value (NIV) for reference against changes in impedance due to an encountered anomaly, such as the air/liquid interface.

It will be understood that the conductive layers and insulative layers are not limited to the exemplary embodiment shown, but may be formed of any suitable thickness, width, length, shape, curvature, area, or configuration. The second unshielded generally coaxial transmission line segment can be used for measuring the impedance of whatever may be located in the inner elongate space or volume 114 (FIGS. 4 and 5) formed between the inner conductive surface 116 of the outer elongate electrode portion 34 and the conductive signal planes of the unshielded electrode section 36B (FIG. 6) formed in the second PCB 94. Further details of the PCB 94 will be described below.

Referring again to FIGS. 4-6, the outer elongate electrode portion 34 is received and secured in the inner annular conductive surface 71 of the housing 46 by press-fitting as one preferred method of assembly. To that end, the outer elongate electrode portion 34 can include a knurled section (not shown) or the like formed at or near an upper or distal edge of the outer electrode portion 34 for biting into the inner conductive surface 71 during assembly, so that the first mounting portion 56 becomes an extension of the outer elongate electrode portion 34.

However, it will be understood that the outer elongate electrode portion 34 can be connected to the housing 46 through other well-known connection means, such as mechanical fastening, welding, adhesive bonding, clamping, snap-fit engagement, threading, heat-shrinking, and so on. In accordance with a further embodiment of the invention, the outer elongate electrode portion 34 can be integrally formed with the housing 46.

No matter what connection means is used, the outer elongate electrode portion 34 is preferably in electrical contact with the inner conductive surface 71 of the central bore 70 extending through the first mounting portion 56, which is in turn electrically connected to ground associated with the first PCB 35 and/or the wall 14 of the tank 12 (FIG. 1) or other grounding location associated with the TDR transducer 10, the tank 12, and/or the machine or system associated with the tank. It will be understood that electrical ground of the transducer 10 can be electrically connected to, or isolated from, the electrical ground of the tank and/or machine or system associated with the tank without departing from the spirit and scope of the invention.

Although it is preferred that the mounting head 28 be constructed of electrically conductive material, such as stainless steel, aluminum, and the like, it will be understood that the mounting head can be constructed of electrically insulative material and provided with conductive surfaces through well-known surface treatment techniques, without departing from the spirit and scope of the invention. It will be further understood that the mounting head can be completely non-conductive, and the measuring probe can be electrically connected to the electronic assembly 32 without the mounting head acting as an intermediate conductor between the measuring probe and the first PCB 35.

Figure 3:
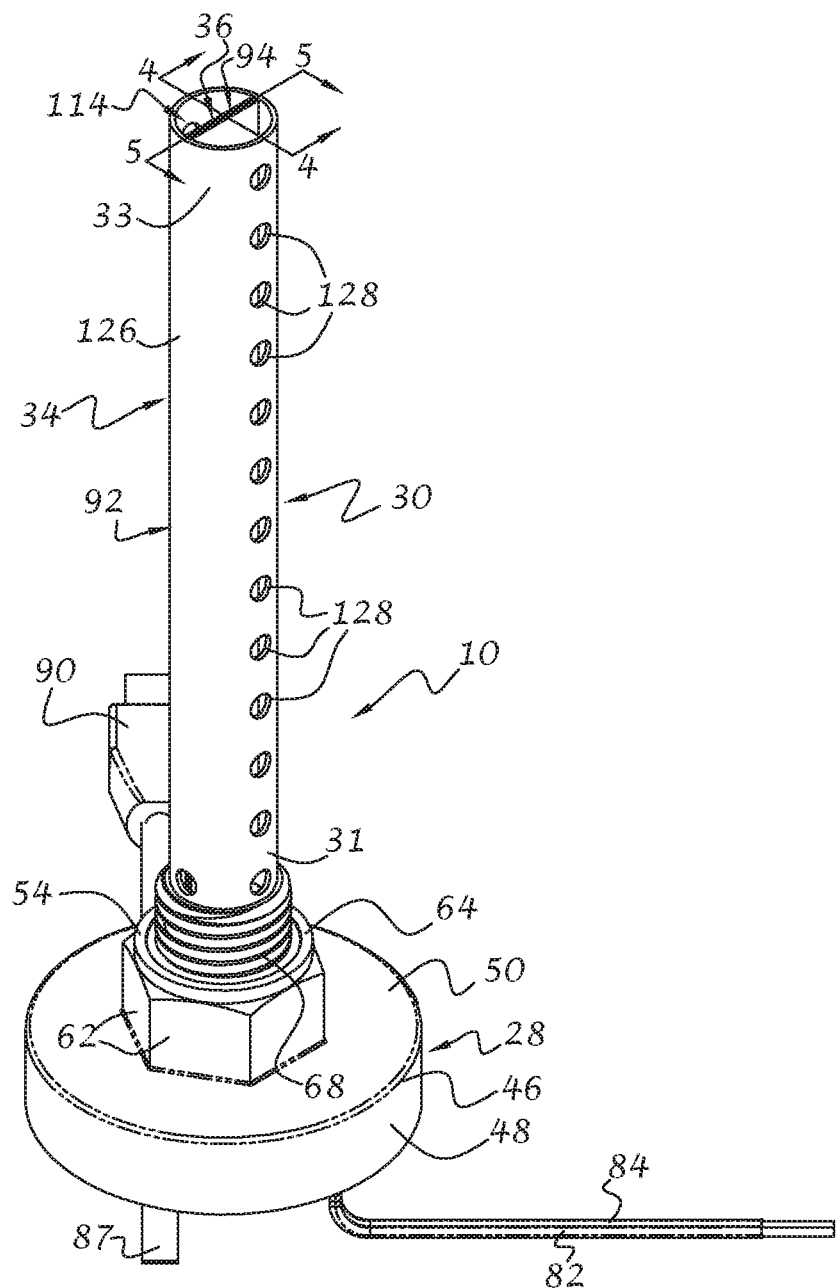
FIG. 3 is an isometric top view of the TDR transducer.

As best shown in FIGS. 3 and 4, the outer elongate electrode portion 34 includes a circular wall 126 that forms the hollow electrically conductive cylinder or tube with the inner conductive surface 116. A first set of openings 128 and a second set of openings 130 extend radially through opposite sides of the wall 126 and spaced axially along the outer elongate electrode portion 34 to facilitate flow into the inner elongate space or volume 114 (FIGS. 4 and 5) formed between the inner conductive surface 116 of the outer elongate electrode portion 34 and the unshielded electrode section 46B (FIG. 6). It will be understood that one or more holes or sets of holes can be eliminated without departing from the spirit and scope of the invention.

As best shown in FIGS. 4-6, the inner elongate electrode portion 36 comprising the PCB 94, is positioned generally centrally within the outer elongate electrode portion 34 by the provision of a cylindrically-shaped spacer 150 located inside the outer electrode portion 34. A rectangular-shaped bore 152 extends axially through the spacer 150 and is sized for frictionally receiving a relatively narrow connecting section or finger 134 that extends from a generally wide measuring portion 132 of the second PCB 94 forming the inner electrode portion 36. Annular grooves 154 are formed around the outer cylindrical surface 156 of the spacer 150 for receiving O-rings 158 to thereby seal the spacer 150 against the inner surface 116 of the outer electrode portion 34.

Since the spacer 150 is coincident with the shielded narrow section 134 of the inner electrode portion 36, no change in impedance of the transducer will occur as the energy pulse travels through the shielded electrode section 36A coincident with the spacer 150, independent of the dielectric constant of the spacer material, as well as its length and thickness, since the outer electrode portion 34 is not in use until the energy pulse clears the ground planes 142 and 144 of the second PCB 94, as previously described.

With this construction, the TDR transducer is not subjected to large return echo signals at the interface between the PCB and the elongate electrodes, and is therefore capable of measuring levels or heights of liquids or other materials in close proximity to the spacer 150, and thus the mounting head 28, thereby increasing the measuring range and accuracy of the actual level or height of material in the elongate measuring probe, as well as increasing the accuracy in dielectric constant measurement.

Figure 8:
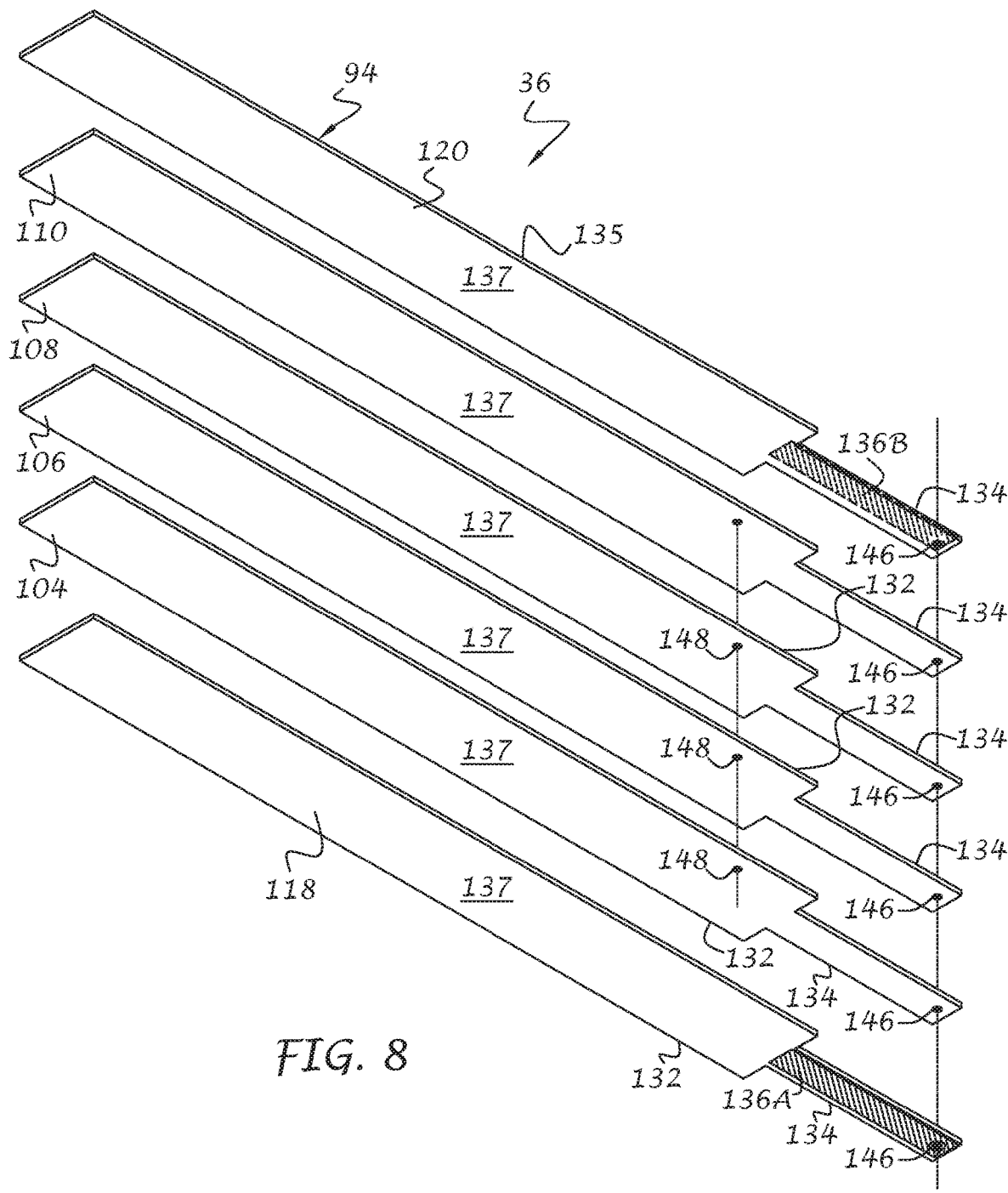
FIG. 8 is an exploded isometric top view of the second electrode portion of the FIG. 7 and FIG. 7A embodiments, illustrating a second opposing face or surface of each substrate layer being void of conductive areas and traces with the exception of outer contact electrodes formed on narrow contact section or fingers on outer surfaces of the PCB for connection to the electronic assembly.

Referring now to FIGS. 6, 7, and 8, each substrate layer 104, 106, 108, and 110, of the PCB 94 of the inner elongate electrode portion 36, includes a first surface 135 facing a first direction (FIG. 7) and a second surface 137 (FIG. 8) facing a second direction opposite the first direction. Each inner substrate layer 104, 106, 108, and 110, as well as each outer substrate layer 118 and 120, are formed with the relatively wide measuring portion 132 and relatively narrow connecting section or finger 134, as previously described. The conductive signal planes 96, 98, 100, and 102 are preferably formed on the first surfaces 135 of the wide measuring portion 132 of the substrate layers 104, 106, 108, and 110, respectively, while the ground planes 142 and 144 are formed on the first surfaces 135 of the substrate layers 104 and 110, respectively. The second surfaces 137 (FIG. 8) of the substrate layers are preferably void of conductive traces and areas to thereby insulate the internal conductive layers. The conductive signal planes 96, 98, 100 and 102 are oriented in a superimposed or stacked relationship.

Likewise, the conductive signal trace 138 is arranged between the first ground plane 142 and second ground plane 144 in a superimposed or stacked relationship. In accordance with an exemplary embodiment of the invention, the signal plane 96 and first ground plane 142 are positioned between the insulative substrate layers 118 and 104; the signal plane 98 and conductive signal trace 138 are positioned between insulative substrate layers 104 and 106; the signal plane 100 is positioned between insulative substrate layers 106 and 108, and the signal plane 102 and second ground plane 144 are positioned between substrate layers 108 and 110, to thereby form alternating conductive and insulating layers associated with the shielded electrode section 36A (FIG. 6) and unshielded electrode section 36B.

The narrow connecting sections 134 of the outer substrate layers 118 and 120 are formed with the first and second outer connecting pads 136A and 136B, respectively. Each connecting pad comprises a conductive ground area or plane located on the outwardly facing surface 135 of substrate layer 118 and the outwardly facing surface 137 of the substrate layer 120. The elongate conductive ground areas or planes 142 and 144 and the conductive connecting pads 136A and 136B are electrically connected together through a first set of conductive through-holes or blind vias 146 formed in each substrate layer 118, 104, 106, 108, 110, and 120 and joined together during manufacture of the PCB 94 in accordance with known techniques for electrically connecting substrate layers of multi-layer PCB's. Likewise, the conductive signal planes 96, 98, 100, and 102 (and conductive signal trace 138 via the conductive signal plane 98) are connected together via inner conductive through-holes or vias 148 formed in each substrate layer 104, 106, 108, and 110. Although two connecting pads 136A and 136B are shown, it will be understood that more or less connecting pads can be provided for communicating with the PCB 35 and associated electronic assembly 32 without departing from the spirit and scope of the invention.

As shown in FIG. 7, the narrow conductive signal trace 138 is preferably formed on the substrate layer 106, and extends from the proximal end 37 of the PCB 94 at the narrow connecting section 134, which is situated at or near the proximal end 31 of the measuring probe 30 to the opposite distal end 39 of the PCB 94, which is situated at or near the distal end 33 of the measuring probe 30. The conductive signal plane 98 is electrically connected to the narrow signal trace 138 and serves as a first wide elongate electrode or conductor 98, which is preferably much wider than the narrow signal trace 138 to ensure impedance matching between first and second transmission lines, respectively.

The first signal plane 98 is formed on the substrate layer 106 and extends from the distal end 39 of the substrate layer 106, and thus the distal end 33 (FIG. 6) of the probe 30, toward the proximal end 37 of the substrate layer 106, and thus the proximal end 31 of the probe 30. The first narrow conductor 138 and the first signal plane 98 are electrically connected together at the distal end 39 of the PCB 94 via a conductive bridge 99 (FIG. 7). Preferably, the first signal plane 98 is connected in series with the first narrow signal trace 138, and is oriented in a generally parallel relationship therewith, so that the narrow signal trace 138 and the signal plane 98 are in juxtaposition.

The substrate layer 108 is superimposed by, and is somewhat similar to, the substrate layer 106, with the exception that the narrow signal trace 138 has not been repeated on the layer 108. The signal plane 100 formed on layer 108 is, however, similar in shape to the conductive signal plane or trace 98 on layer 106. Likewise, the signal plane 96 on layer 104 and the signal plane 102 on layer 110 are similar in shape to the signal plane 100. The conductive signal planes 96, 98, 100, and 102 are electrically connected together via the inner through-holes or blind vias 148 formed in each substrate layer 104, 106, 108, and 110, and thus electrically connected to the first narrow signal trace 138 on layer 106.

Substrate layers 104 and 110 are similar in construction, with a first ground plane or area 142 formed on the substrate 104 above the substrate 106 and in juxtaposition with the signal plane 96, and a second ground plane or area 144 formed on the substrate 110 below the substrate 106 and in juxtaposition with the signal plane 102, so that the first and second ground planes are spaced above and below the first narrow conductive trace 138 on the substrate 106. The ground planes 142 and 144 are electrically connected or stitched together via the conductive inner through-holes or blind vias 146, and are normally connected to ground associated with the PCB 35 of the electronic assembly 32 (FIG. 6), so that the first narrow conductive trace 138 is surrounded by the ground planes 142 and 144.

A plurality of first conductive elements, comprising first conductive blind vias or thru-holes 140, are formed on the substrate layer 106 and extend adjacent to the conductive signal trace 138. Likewise, a plurality of second conductive elements, comprising second conductive blind vias or thru-holes 141, are formed on the substrate layer 108 below the substrate layer 106 in alignment with the first conductive blind vias 140. The conductive blind vias 140 and 141 are electrically connected to ground and stitched together around the periphery and ground, so that the narrow elongate conductive trace is surrounded by ground on all sides, i.e. the ground planes 142 and 144 above and below the trace 138, and the stitched vias 140 and 144 at either side of the signal trace 138, to thereby form the first elongate transmission line segment.

With the above-described construction, the first shielded electrode section 36A (FIG. 6) extends along the PCB 94 from the proximal end 37 to the distal end 39 thereof, such that the energy pulse, when generated and transmitted, radiates between the conductive signal trace 138 and the surrounding ground planes and vias, as well as any return echoes propagating in the opposite direction due to a detected difference in impedance outside of the shielded electrode section, so that the outer electrode portion 34, along with liquid, air or the like in the inner elongate space or volume 114 and any outer anomalies due to contaminants, probe construction, and so on, can be bypassed in the first propagation direction and the return echo direction. Likewise, the second unshielded electrode section 36B (FIG. 6) is also formed between the connected conductive signal planes 96, 98, 100, and 102 and the outer electrode portion 34 between the distal end 39 of the PCB 94 and the proximal end 37 thereof, and thus the distal end 33 and proximal end 31 of the elongate measuring probe 30, so that the energy pulse radiates across the inner elongate space or volume 114 between the connected conductive signal planes and the outer electrode portion 34, to detect a change in impedance when the pulse encounters anomaly, such as the air/liquid interface as previously described, to thereby generate a return echo, which propagates in the reverse direction until the first shielded electrode section 36A is reached, whereupon the return echo reversed direction and propagates therealong until reaching the proximal end of the probe and thus the electronic assembly 32 where further processing of the return echo occurs.

The combined areas of the conductive signal planes 96, 98, 100, and 102, comprising the width and length thereof, the inner elongate measuring volume 114 and inner conductive surface 116 of the outer electrode portion 34 and any substrate layers and coatings located between the inner measuring volume and the signal planes together define the second elongate transmission line segment with a nominal impedance value (NIV), which preferably matches the NIV of the first shielded electrode section 36A to reduce or eliminate the generation of a return echo as the RF pulse transitions between the first and second transmission lines of the elongate measuring probe 30 across the conductive bridge trace 99 (FIG. 7).

The first elongate conductive signal trace 138 is electrically connected to the pulse generator, transmitter and receiver circuitry of the electronic assembly 32, preferably via the elongate calibration trace 43 (FIG. 10) associated with the PCB 35. The consistent thickness and dielectric constant of the substrate material of each layer ensures repeatable spacing of the ground planes from the first narrow conductive trace 138 during manufacture, and thus a repeatable nominal impedance value in the shielded electrode section 36A.

The provision of the conductive connecting pads 136A, 136B on the outside surfaces of the PCB 94, as discussed above, enable at least electrical connection with the first PCB 35 of the electronic assembly 32 (FIG. 6), and preferably both mechanical and electrical connection, through known connection means, such as the provision of a first connector (not shown) with two or more male or female pins or fingers on the PCB 35 that mate with corresponding female or male pins or fingers, respectively, of a second connector mounted on the PCB 94, such as an edge connector. In this manner, the ground planes of the PCB 94 are connected to electrical ground associated with the PCB 35 and/or housing 46 (FIG. 6), and the conductive signal planes with the signal trace 138 and bridge 99 are connected to the elongate calibration trace 43 (FIG. 10) associated with the RF pulse generator and transmitter and the return echo receiver. Other known connection means can include one or more conductive spring clamps on the PCB 35 for mechanically grasping the connecting pads 136A and 136B of the PCB 94 therebetween while in separate electrical contact with the ground planes and conductive signal planes and signal trace, as well as other electro-mechanical fastening means, jumper wires extending between the PCB 94 and the PCB 35, direct or indirect electrical and/or mechanical connection through soldering, joining, bonding with conductive adhesive, combinations thereof, and so on, so long as the generated electromagnetic pulse is provided to the second PCB 94 for propagation through the shielded probe electrode section 36A, and between the unshielded probe section of the PCB 94 and the outer electrode portion 34 for propagation therealong, with return echoes being communicated from the PCB 94 to the PCB 35 for further processing.

The insulative substrate layers 118, 104, 106, 108, 110, and 120 (FIG. 7) of the PCB 94 of the elongate second or inner electrode portion 36 can be formed of common substrate materials, such as phenolic cotton paper (FR-2), cotton paper and epoxy (FR-3), woven glass and epoxy (FR-4, FR-5), matte glass and polyester (FR-6), woven glass and epoxy (G-10), cotton paper and epoxy (CEM-1, CEM-2), non-woven glass and epoxy (CEM-3), woven glass and epoxy (CEM-4), woven glass and polyester (CEM-5), and/or other suitable materials. The conductive signal planes 96, 98, 100, and 102, the conductive ground planes 142 and 144, as well as the connecting pads 136A and 136B, can be constructed of any suitable conductive material, such as copper, aluminum, gold, silver, and so on. The substrate layers and conductive layers can be formed and bonded together to form a multilayered PCB using well-known manufacturing techniques.

Although the elongate measuring probe 30 is described herein with the first electrode portion 34 comprising an outer conductive cylindrical body and the second electrode portion 36 comprises signal planes and ground planes surrounded by the outer electrode portion to function as both shielded and unshielded guided wave radar sections or transmission line segments of the probe 30, it will be understood that the term "plane" does not refer only to flat, plate-like shapes, but can be of any suitable shape and/or size and spaced at any suitable distance so long as one or more properties and/or conditions of liquid or other material located in the inner measuring space between the inner and outer electrode portions can be determined.

Depending on the type of liquid or other medium being measured, a thin, insulative coating can be applied to the inner conductive surface 116 of the outer electrode portion 34 and/or the outer surfaces of the inner electrode portion 36, to both protect the electrode(s) from corrosion and finely adjust the nominal impedance value (NIV) of the measuring probe 30 along the unshielded transmission line segment when the inner measuring volume 114 (FIG. 4) is void of liquid or other material to be measured. The NIV can also be adjusted by modifying the material and/or thickness of any insulative coating(s), the material and/or thickness of the outer substrate layers 118 and 120 of the second PCB 94, the surface areas of the conductive signal planes and ground planes, and the gap between the outer and inner electrodes.

Figure 9:
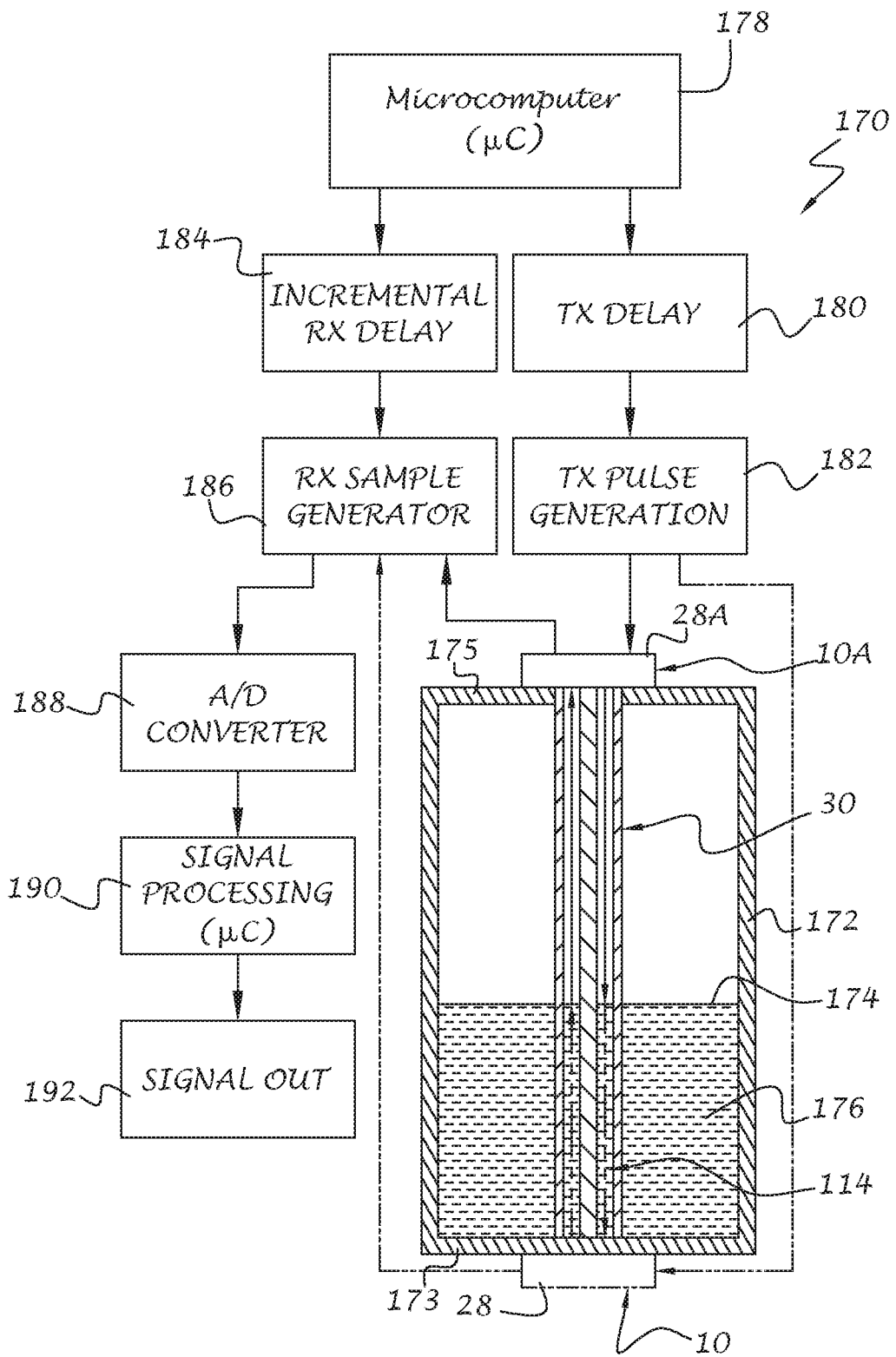
FIG. 9 is a simplified schematic block diagram showing basic relationship between components of the electronic assembly and the measuring probe of the TDR transducer in accordance with the invention, along with a further embodiment of the invention having electromagnetic pulse generators, transmitters, and receivers mounted at opposite ends of the elongate measuring probe.

Referring now to FIG. 9, a simplified schematic block diagram 170 illustrates further details of the electronic assembly 32 with exemplary means for generating and transmitting electromagnetic energy waves or pulses for propagation along the measuring probe 30 of the TDR transducer 10 and/or TDR transducer 10A (shown in broken line), and exemplary means for receiving and analyzing reflection waves or return echoes, it being understood that the exemplary means can greatly vary without departing from the spirit and scope of the invention. The TDR transducer 10 can be mounted at or otherwise connected to a bottom 173 of a tank or container 172 with the measuring probe 30 extending upward into the tank, as previously described. Likewise, a TDR transducer 10A can also or alternatively be mounted at or otherwise connected to a top 175 of the tank or container 172 with the measuring probe 30 extending downward into the tank, for determining the level 174 of liquid 176 within the tank, as well as dielectric constant and/or other material properties as discussed above, in accordance with the invention. As shown, block 178 is representative of a microcomputer (labeled µC). The microcomputer is in turn connected to circuitry for generating the energy pulses and transmitting the waves along the first shielded transmission line segment 215 (FIG. 12A) and second unshielded transmission line segment 217 (FIG. 12B) of the measuring probe 30. The circuitry can include purely analog components, a combination of analog and digital components, or purely digital components. In one preferred embodiment of the invention, the circuitry comprises analog circuitry that generates the energy pulses and a transmitter for propagating the generated pulses along the transmission line segments.

Accordingly, as represented by block 180, the microcomputer initiates a transmit (TX) pulse delay with a predetermined time or delta time increase between pulses to enable reception of a return echo prior to transmission of the energy pulse, so that the electronic assembly 32 can receive data even prior to the first transmission. In this manner, the measuring probe 30 can be monitored for electronic signals prior to the first wave transmission thereby ensuring that all return echo data is received with a high degree of confidence.

At the end of the delay period, the electromagnetic energy pulse is generated and transmitted, as represented at block 182, along the length of the measuring probe 30, through both the first shielded transmission line segment and back again along the second unshielded transmission line segment for determining liquid level, material height, and so on, as previously described, within the inner elongate space or volume 114 (FIG. 4).

The transmit pulse occurs with picosecond resolution, which can be performed by the calibrated clock timing of low-cost processors, microcomputers, microcontrollers, or the like, or can be provided with a separate clock function independent of the processor. The processor is also connected to analog circuitry for generating an incremental receive (RX) delay signal (block 184) upon receipt of a RX generation signal from the microcontroller with nanosecond resolution. The Incremental RX Delay circuitry is in turn connected to analog circuitry (block 186) for generating a sample receive (RX) signal which in turn collects a sample reading or signal from the electromagnetic pulse traveling along the calibration trace 43 (FIG. 10) associated with the PCB 35 (FIGS. 2 and 10) of the electronic assembly 32, and/or along the measuring probe 30. The nanosecond resolution is preferably generated by the analog circuitry associated with block 184 to permit the use of a low-cost microcomputer.

Once an analog measurement signal is received at block 186, an analog to digital (A/D) converter (block 188) associated with the microcomputer converts the signal into digital form for further signal processing at block 190. Signals indicative of liquid level or other material level, linear movement, the dielectric properties, and so on, can then be stored in memory associated with the microcomputer and sent to a display or further processing circuitry and/or further software routines for displaying and/or analyzing the signal, as represented by block 192.

In accordance with yet a further embodiment of the invention, and with reference again to FIG. 9, rather than the TDR transducer 10, 10A being mounted to either the bottom 173 or top 175 of the tank 172, the TDR transducer can be mounted such that transmitters and receivers are connected to both the top and bottom of the tank, as shown by transducer 10 with mounting head 28 connected to the bottom 173 of the tank 172, and the transducer 10A with mounting head 28A connected to the top 175 of the tank.

Both mounting heads 28, 28A share the common elongate measuring probe 30 with the outer conductive electrode portion 34 and inner conductive electrode portion 36 having the shielded electrode section 36A (FIG. 6) and unshielded electrode section 36B, as previously described, such that the energy pulse is confined while propagating along the first elongate transmission line segment between the conductive signal trace or conductive trace 138 (FIG. 7) and the ground planes 142 and 144 and associated stitched vias, thereby bypassing the outer electrode portion 34 when the pulse travels in either direction through the shielded electrode section 36A, to ensure that little or no signal loss occurs, yet restores communication to the second elongate transmission line segment between the unshielded electrode section 36B of the inner electrode portion 36 and outer electrode portion 34 at the terminal or distal end 39 (FIG. 6) of the shielded electrode section 36A, so that the energy pulse is exposed to the volume of liquid, air, or other materials located between the electrodes 34 and 36, as previously described.

When the transducer 10A is mounted to the top of the tank, the electromagnetic energy pulse is launched into the liquid 176 or other material between the inner and outer electrodes after propagating through the shielded electrode section 36A, so that the liquid or other material is measured from the bottom of the probe 30 to the top thereof. This would permit better measurement of the material properties, such as dielectric constant, over the bottom-mounted transmitter/receiver combination of the transducer 10. Likewise, the bottom-mounted transmitter/receiver represented by transducer 10A, would be better suited for measuring the level of liquid or other materials within the inner elongate space 114, since the energy pulse travels from the bottom of the probe 30 to the top thereof via the shielded electrode section 36A, so that the liquid or other material is measured from the top of the probe 30 to the bottom thereof via the second unshielded transmission line segment between the inner unshielded electrode section 36B and the outer electrode portion 34.

With both ends of the elongate measuring probe 30 connected to mounting heads 28 and 28A and their respective transmit and receive circuitry, the RF pulse is launched into the first shielded transmission line segment having the shielded electrode section 36A and ground planes 142 and 144, and emerges either above or below the surface 174 of the liquid 176 (or other material) depending on the direction of initial launch through the shielded transmission line segment. Once the electromagnetic energy pulse clears the ground planes 142 and 144 and begins to propagate along the conductive planes or electrodes 96, 98, 100, and 102 that are electrically connected together with the conductive trace 138, the ground switches to the outer elongate electrode portion 34 to form the second unshielded transmission line segment, with the pulse radiating between the unshielded electrode section 36B and the inner surface 116 of the outer electrode portion 34 through the measuring volume 114. The pulse then propagates, in contact with the liquid, upward toward the top, or downward toward the bottom, of the probe 30, depending on the direction of the initial launch through the first shielded transmission line segment. During upward propagation of the pulse associated with the mounting head 28A, part of the RF pulse is reflected at the liquid/air interface, which creates the afore-mentioned return echo, which travels back toward the bottom of the probe 30 where it re-enters the first shielded transmission line segment of the probe, then travels upwards, unimpeded by changes in impedance, towards the top of the probe 30, and thus the top 175 of the tank 172, where the RF pulse is delivered to the receiver. Likewise, during downward propagation of the RF pulse associated with the mounting head 28, part of the RF pulse is reflected at the air/liquid interface (since it travels through the air between the electrodes prior to reaching the liquid), which creates a return-echo, which travels back, unshielded, towards the top of the probe 30, then travels down along the first shielded transmission line, unimpeded by changes in impedance, towards the bottom of the probe 30, and thus the bottom 173 of the tank 172. It will be understood that any combination of transmitters and/or receivers can be used on each end of the probe 30.

In accordance with a further embodiment of the invention, the first shielded electrode section 36A need not extend entirely along the length of the probe 30, but may extend along a first portion thereof, for example, to bypass changes in impedance at the mounting head, transition between the mounting head and electrodes, spacers located between the electrodes, and so on, while the second unshielded electrode section 36B can extend therefrom to the end of the probe. This is especially advantageous with top-mounted transducers, since the RF pulse will travel through a section of air in the inner elongate space before reaching the liquid surface, where the return echo would be generated, and propagate back up the unshielded electrode section and through the shielded electrode section. It will be understood that more than one shielded electrode section can be located along the length of the probe for shielding the RF pulse and/or return echo at predefined locations.

In accordance with yet a further embodiment of the invention, the measuring probe 30 can include more than one shielded electrode section, with each section extending the length of the probe. For example, a first shielded electrode section can be associated with the top-mounted transmitter/receiver electronics, while a second shielded electrode section, independent of the first shielded electrode section, can be associated with the bottom-mounted transmitter/receiver electronics. In this manner, the RF pulse transmitted from one end of the probe 30 can propagate along the unshielded electrode section first before traveling along the shielded electrode section, while the RF pulse transmitted from the other end of the probe 30 can propagate along the shielded electrode section first before propagating along the unshielded electrode section.

Although the invention has been described with a combination of digital and analog circuitry in conjunction with generation of the energy pulse, the generation of transmit and timing pulses, and the reception and analysis of the return echoes, it will be understood that the invention is not limited thereto but can be practiced through any suitable means for generating and propagating a wave or pulse of electromagnetic energy, as well as receiving and analyzing any return echo.

It will be understood that the exemplary electronic means, including the "microcomputer" as used herein, is not limited to a single system on a chip (SoC) device with one or more central processing unit(s) (CPU's), onboard memory (RAM, ROM, etc.), timers, ports, D/A converters, and so on, but can include a separate digital and/or analog processor or processing unit that interfaces with analog and/or digital components required to execute one or more instructions of a software program for operating the TDR transducer, including the generation of one or more analog and/or digital signals associated with electromagnetic pulse transmission and/or reception at various times (and thus locations) along the length of the TDR transducer for determining liquid level, material height, linear movement, and so on.

Accordingly, the present invention is not limited to a single type of processing unit but can include any suitable electronic means including microprocessors, microcontrollers, microcomputers, processors, programmable logic chips (PLC's), ASIC devices, and/or processing systems in digital and/or analog form so long as one or more of the various tasks associated with measuring the impedance or the change in impedance at various locations along the calibration trace and/or along the measuring probe of the TDR transducer and translating the resultant return echo signals into measurement values can be performed at least in part. Electronic components such as internal and external memory for storing program instructions and data, external and internal timers, D/A converters, and so on, can be provided as integral and/or separate components and connected in a well-known manner for operation of the TDR transducer. Hence, it will be understood that the invention is not limited to one type of processor or electronic means for executing one or more instructions and/or timer and/or control functions, but may include any equivalent structure and/or programming that changes the structure of the processor, memory, and/or processor components to accomplish, at least in part, one or more of the required tasks.

Figure 10:
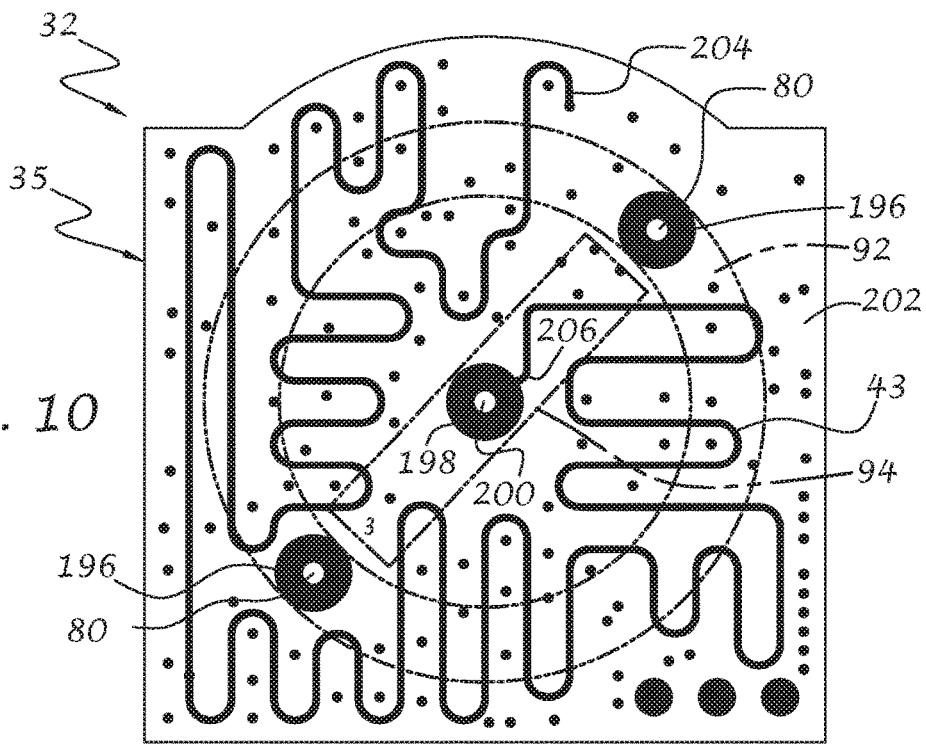
FIG. 10 is a top plan view of one of the layers of the PCB associated with the electronic assembly in accordance with an exemplary embodiment of the invention showing a calibration trace formed on the one or more layers, along with features for connecting the PCB with the elongate measuring probe.

Referring now to FIG. 10, the PCB 35 is mechanically and electrically connected to the upper surface 76 (FIG. 6) of the annular boss or side wall 72 of the housing 46 by fasteners 78, such as self-threading fasteners, that extend through conductive openings or thru-holes 80 of the PCB 35 as previously described. A circular trace 196 can surround each conductive opening 80 for electrical contact with either the head 79 (FIG. 6) of the fasteners 78 or a lock-washer (not shown) sandwiched between the head 79 and the trace 196. In this manner, the PCB 35 is both electrically and mechanically connected to the annular boss 72 of the housing 46. The inner conductive surface 71 of the housing 46 is in turn mechanically and electrically connected to the outer elongate electrode portion 34, preferably through press-fitting as previously described, so that the PCB 35 is electrically connected to the outer electrode portion 34 via the housing 46. Preferably, the outer electrode portion 34 and the housing 46 are connected to ground, with the conductive openings 80 and circular traces 196 also being connected to ground.

The PCB 35 also includes a conductive thru-hole or opening 198 with a circular trace 200 surrounding the opening 198 for mechanical and electrical connection with the inner electrode portion 36. Preferably, the circular trace 200 and opening 198 are connected to the transmitter and receiver circuitry to thereby create the RF pulses that propagate along the elongate measuring probe 30.

In accordance with a further embodiment of the invention, the outer electrode portion 36 can have a wall thickness or flange wide enough to receive the fastener 78 or other connection means for direct electrical and mechanical connection to the PCB, thereby bypassing the annular side wall 71 of the housing 46.

Although it is preferred that the mounting head be constructed of electrically conductive material, such as stainless steel, aluminum, brass, and so on, it will be understood that the mounting head can be constructed of electrically insulative material and provided with conductive surfaces through well-known surface treatment techniques, without departing from the spirit and scope of the invention.

With the third conductive opening 198 being centered between the first and second conductive openings 80, the inner elongate electrode portion 36 is coaxial with the outer elongate electrode portion 34. The openings 80 are connected to electrical ground of the PCB 35, while the opening 198 and surrounding trace 200 are connected to the pulse generator, transmitter, and receiver of the electronic circuitry for transmitting electromagnetic energy pulses along the first shielded transmission line segment and second unshielded transmission line segment of the probe 30, and receiving data reflective one or more return echoes through the shielded transmission line segment.

Referring to FIG. 10, the calibration trace 43 is formed on one of the outer surfaces and/or intermediate surface(s) or layer(s) 202 of the PCB 35, it being understood that the intermediate layer 202 can represent one or more internal layers and/or surfaces associated with one or more intermediate layers between top and bottom layers in a multi-layer PCB. When formed on one or more internal surfaces or layers 202, the calibration trace can be isolated from other electronic traces, so that a dedicated surface or layer for the calibration trace 43 is provided. In accordance with one exemplary embodiment of the invention, the calibration trace 43 extends across a substantial area of the PCB between a first end 204 and a second end 206 of the calibration trace, so that the calibration trace is approximately the same length as the elongate measuring probe 30. With the calibration trace 43 being approximately equal in length to the probe 30, the actual distance measurement can be determined without the cumulative errors associated with a much shorter calibration trace. By way of example, if the elongate measuring probe is approximately twenty-four inches (67 cm) in length, it is preferred that the calibration trace also be approximately twenty-four inches (67 cm) in length. If the measuring probe is twelve inches (30.5 cm) in length however, 24-inch (67-cm) long calibration trace will increase the accuracy of measurement even more. In this manner, high accuracy can be achieved with the measurement of liquid level, granular material level, as well as other properties, such as the dielectric constant of the material being measured, and so on.

With the size of the PCB 35 being limited to fit within a housing 42 or chamber of a particular size, the length of the calibration trace 43 can greatly vary, and need not be approximately equal to the length of the measuring probe. By way of example, the calibration trace can range between about 0.1 inch (0.254 cm) to over 100 inches (254 cm) or even much greater lengths depending on the dimensional constraints of the PCB, how many intermediate or other layers the calibration trace is divided between and connected via conductive thru-holes to maximize the length of the calibration trace, as well as the width of the calibration trace, and the spacing between rows of the calibration trace. Likewise, the length of the measuring probe can range anywhere from 0.25 inch (0.635 cm) to over 100 yards (91.44 meters) or even extend to much greater lengths. Accordingly, although in one exemplary embodiment it is preferred that the calibration trace length and measuring probe length be approximately equal, it will be understood that the invention is not limited thereto, but the overall length of the entire waveguide or transmission line, which includes both the calibration trace and the elongate electrodes, can greatly vary depending on the measurement constraints of a particular installation or application of the TDR transducer and the size limitations of the PCB 35 as dictated by the configuration of the mounting head or other housing or structural limitations for receiving the PCB.

In order to facilitate description of the invention, the calibration trace 43 will be described as being associated with the intermediate layer or surface 202, it being understood that the configuration of the calibration trace can greatly vary. The first end 204 of the calibration trace 43 is connected to the electromagnetic pulse generating circuitry of the electronic assembly 32 so that the electromagnetic pulse is transferred onto the calibration trace 43 and travels along its length toward the second end 206. The second end 206 of the calibration trace 43 is connected to the third conductive opening or thru-hole 198 so that the electromagnetic pulse travels along the length of the measuring probe 30 via the shielded electrode section and in reverse upon reaching the unshielded electrode section.

The physical length of the calibration trace is known and can be used in conjunction with the measured electronic length of the calibration trace to calibrate the clock cycle of the microcomputer 178 (FIG. 9) or other processing means, and thus the electronic length of the calibration trace so that accurate distance to an anomaly (such as the change in dielectric constants between media) within the unshielded section of the measuring probe 30 can be determined. One or more predefined anomalies can be inserted or created at one or more locations along the calibration trace to thereby create one or more calibration trace return echoes for calibrating the transducer to a high degree of precision.

In accordance with one embodiment of the invention, the inserted anomalies or discontinuities can be mechanical in nature, such as a change in the width or thickness of the calibration trace, a transition between the calibration trace and one or more of the elongate electrodes (and thus a discernible change in dielectric properties), and the inclusion of one or more spacers in the volume between the inner and outer electrodes at predetermined locations, which will change the dielectric constant, whether immersed in air or liquid.

In accordance with a further embodiment of the invention, the inserted anomalies or discontinuities can comprise one or more electronic components, such as transistors, biased diodes, switches, and the like, associated with the calibration trace and/or electrodes that can be selectively activated and deactivated either manually or automatically through processor control, at intermediate and/or end locations along the calibration trace 43 and/or electrodes to thereby create one or more identifiable return echoes that can be used for calibrating a clock or the like associated with the microcomputer.

No matter what embodiment is used for identifying one or more points along the transmission line, including the calibration trace and/or the electrodes, including a combination of mechanically- and electrically-induced calibration anomalies, the one or more calibration anomalies can be used for calibrating the clock or the like associated with the microcomputer, as well as timing circuitry associated with generating transmit and receive signals, for electronically determining a start point, intermediate point, and/or end point of the calibration trace, as well as the distance(s) therebetween. The start, intermediate, and/or end point(s) of the electrodes can also or alternatively be calibrated to correlate the actual length of the calibration trace or the actual length of the inner or outer electrode, with the measured electrical length. In this manner, the physical length between the known induced calibration anomalies, which can include a predefined length of the waveguide or transmission line, such as a portion of the calibration trace or the entire length thereof, the combination of the calibration trace and electrodes or portions thereof, and so on, is correlated with the electronically measured length between the induced anomalies (the "electronic length") as determined by the distance between the return calibration echoes, to ultimately attain high accuracy and repeatability in measurement of the medium between the elongate electrodes.

In accordance with a preferred embodiment of the invention, the physical length of the calibration trace is approximately equal to the physical length of the elongate electrodes. In this manner, greater measurement accuracy of the medium under consideration over prior art transducers can be achieved. However, it will be understood that the length of the calibration trace is not limited to the length of the measuring probe or electrodes, but can be of any reasonable length to obtain acceptable measurement accuracy in accordance with standards dictated by different industries. For example, measurement of liquid level within a fuel tank may be held to a lower level of accuracy than measurement of linear movement between critical components in machining operations. Accordingly, the length of the calibration trace and/or the distance between induced anomalies associated with the calibration trace can be selected to meet, exceed, or even greatly exceed industry standards without an increase in manufacturing costs.

Figure 11:
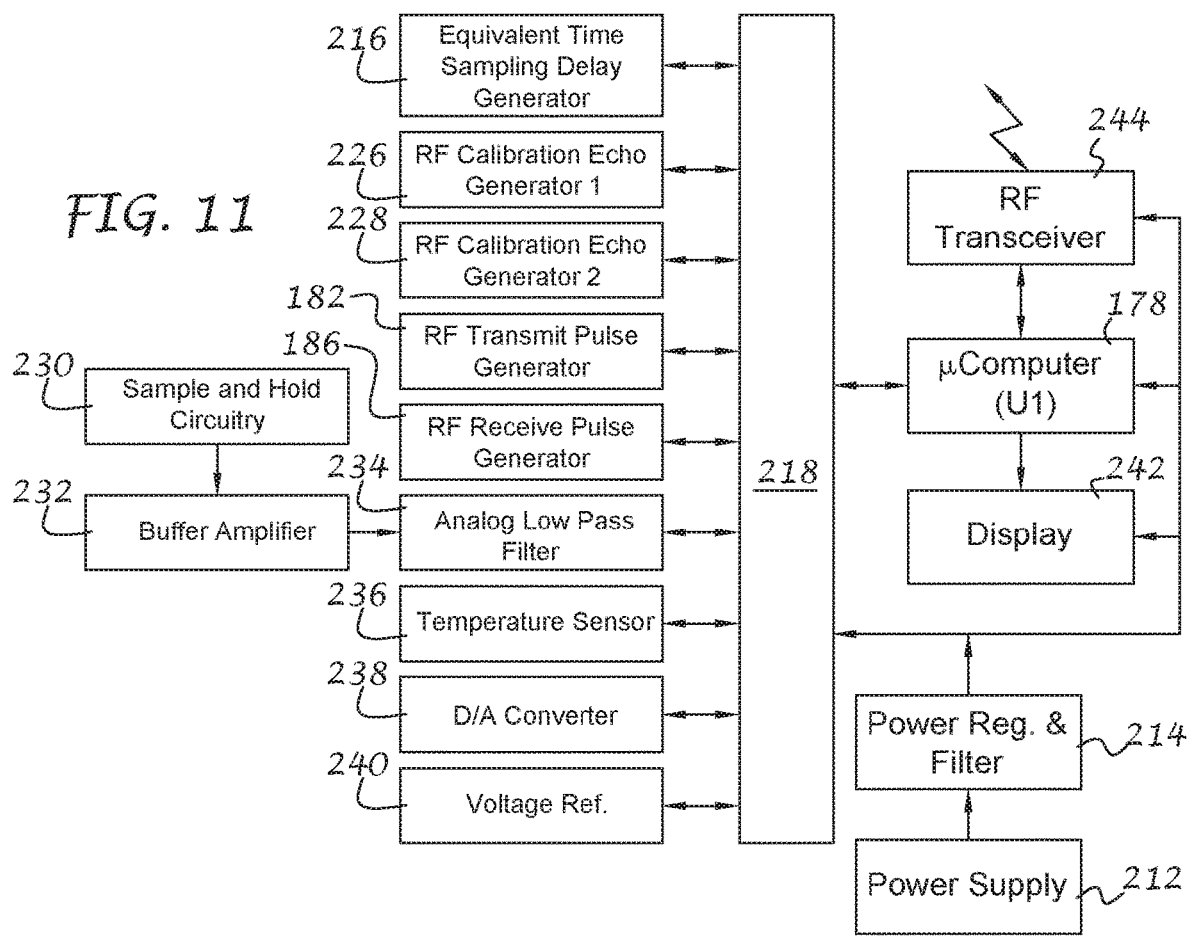
FIG. 11 is a block diagram representing electronic circuitry of the TDR transducer in accordance with an exemplary embodiment of the invention.

Referring now to FIG. 11, a more detailed block diagram 210 of the electronic assembly 32 with exemplary electronic means for operating the TDR transducer 10 (FIG. 1) or 10A (FIG. 1A) in accordance with the invention is illustrated. The electronic assembly 32 includes a plurality of different electronics modules that interface with the microcomputer 178 (U1) for operating the TDR transducer. One of the modules includes a power supply 212 which, in accordance with an exemplary embodiment of the invention, receives an approximate range of power supply inputs between about 7 VDC and about 32 VDC, which is typically provided by a wide variety of vehicles, machines, systems, or other mechanisms associated with the TDR transducer, and converts the input supply voltage to 5 VDC operating output voltage to power the various electronic components 41, including the electronics modules, of the electronic assembly 32. It will be understood that the power supply module 212 is not limited to the particular supply ranges or the operating voltage as described, but may greatly vary depending on the power available from the vehicle, machine, system, or other device, as well as the required operating voltage of the various electronic components associated with the electronic assembly 32 of the invention.

Since the TDR transducer may be used by vehicles or machines with undesirable electrical noise, such as voltage spikes and variations, transient voltages, EMI, back EMF, and so on, that could render inoperative one or more modules of the electronic assembly 32, a power regulator and filtering module 214 can be provided along with the power supply 212 to ensure a stable supply voltage to the electronics and protect the electronics from the undesirable electrical noise. Since the electronics of the power regulator and filtering module 214 are known and may greatly vary depending on the particular vehicle, machine or system associated with the TDR transducer and the presence or absence of undesirable electrical noise, the power regulator and filtering module will not be further described. However, where electrical noise is filtered elsewhere, and/or a stable power supply is available, the module 214 or portions thereof can be eliminated.

An Equivalent Time Sampling (ETS) Delay Generator module 216 is connected to the microcomputer 178 (U1) via a general interface module 218. The interface module 218 can include known communication protocol, such as a controller area network (CAN) bus, Local Interconnect Network (LIN), Factory Instrumentation Protocol (FIN), Vehicle Area Network (VAN), wired or wireless networks, and/or various other interfaces as needed for providing direct and/or indirect communicating between modules, between the microcomputer 178 and the modules, and as shown, providing power to one or more of the modules. The interface module 218 can also or alternatively include passive and/or active components for amplifying, filtering, buffering, converting signals between analog and digital states and vice-versa, or otherwise modifying signals associated with the modules and the microcomputer.

The module 216 generates an incremental delay needed for equivalent time sampling (ETS) of an electromagnetic pulse transmitted many times during a single measurement cycle. The module 216 includes provisions for highly accurate timing associated with actuating the firing of many pulses during a measurement cycle that propagate along the shielded and unshielded electrode sections to create an echo profile (not shown) and for actuating the receiver for sampling (and holding) data associated with the echo profile created by each transmitted pulse.

One exemplary feature of the invention is the capability of initially receiving data prior to actuating the transmission of electromagnetic pulses so that the echo profile can be measured before the first pulse is transmitted and propagated along the transmission lines, thereby ensuring that the beginning of an echo profile can be received and analyzed. As more and more pulses are fired in quick succession, the timing gradually changes from receiving data before pulse transmission to receiving data after pulse transmission. In this manner, data associated with the end of the echo profile after the last pulse transmission can also be received and analyzed. Accordingly, the entire echo profile from before the first pulse transmission to after the last pulse transmission, representative of the impedance of the TDR transducer along the entire length of the elongate measuring probe 30, can be received during a single measurement cycle for determination of liquid level and other measurable conditions. Preferably, several measurement cycles of plural transmissions are also performed and averaged or otherwise statistically combined for increased reliability of the measurement data.

The ETS module 216 generates both a transmit timing signal for generating the electromagnetic pulse on the calibration trace 43 (FIG. 10) when provided, and/or the shielded and unshielded electrode sections, and a receive timing signal for actuating receipt of a single data point along the echo profile during a single transmission. Each subsequent transmitted pulse increases by a predetermined time interval or segment $\Delta T$ longer than the preceding pulse, to thereby generate and capture a data point representative of the impedance and change in impedance at a particular position where the data point is captured along the waveguides and/or transmission line segments, including the calibration trace 43 and/or the shielded and unshielded electrode sections.

Figure 12A:
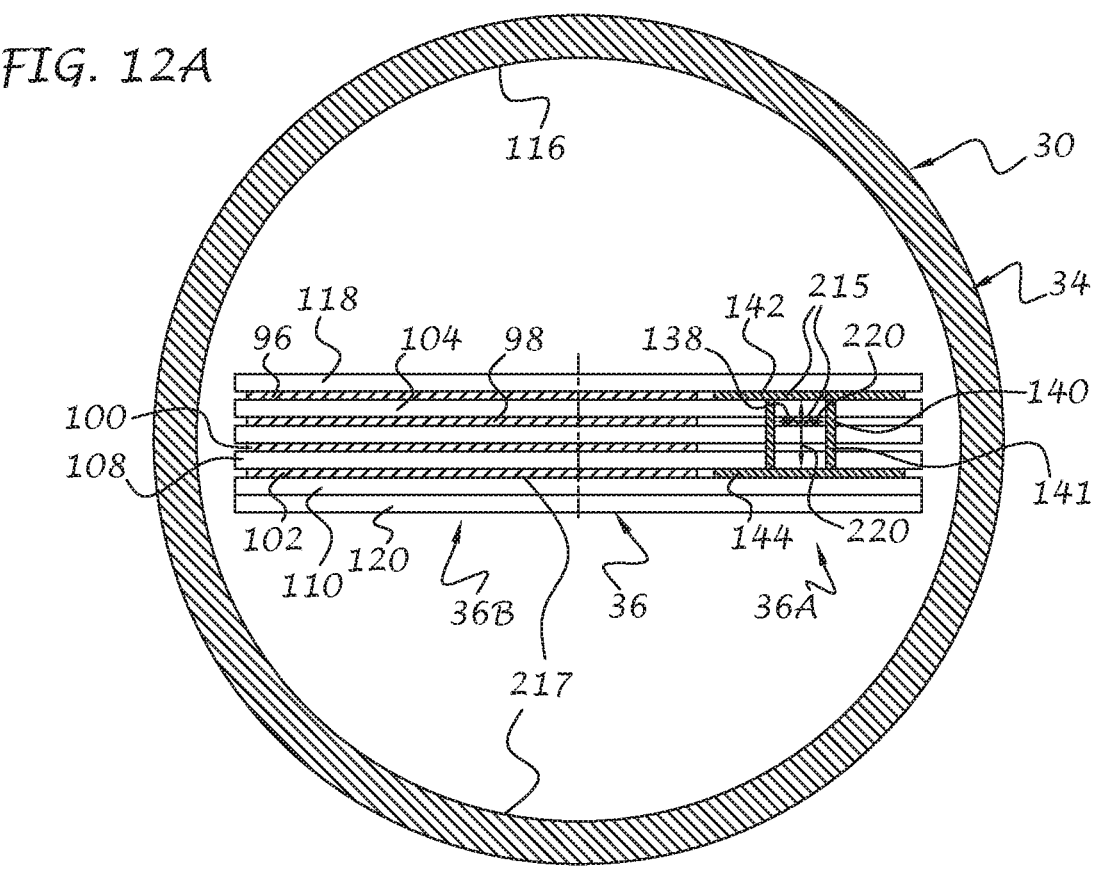
FIG. 12A is an enlarged sectional view of the elongate measuring probe taken along line 12A-12A of FIG. 1, and emphasizing the shielded electrode section, in exaggerated scale, associated with the second elongate electrode portion and schematically illustrating radiation of an signal between the conductive trace and ground planes during propagation of the energy pulse therealong.
Figure 12B:
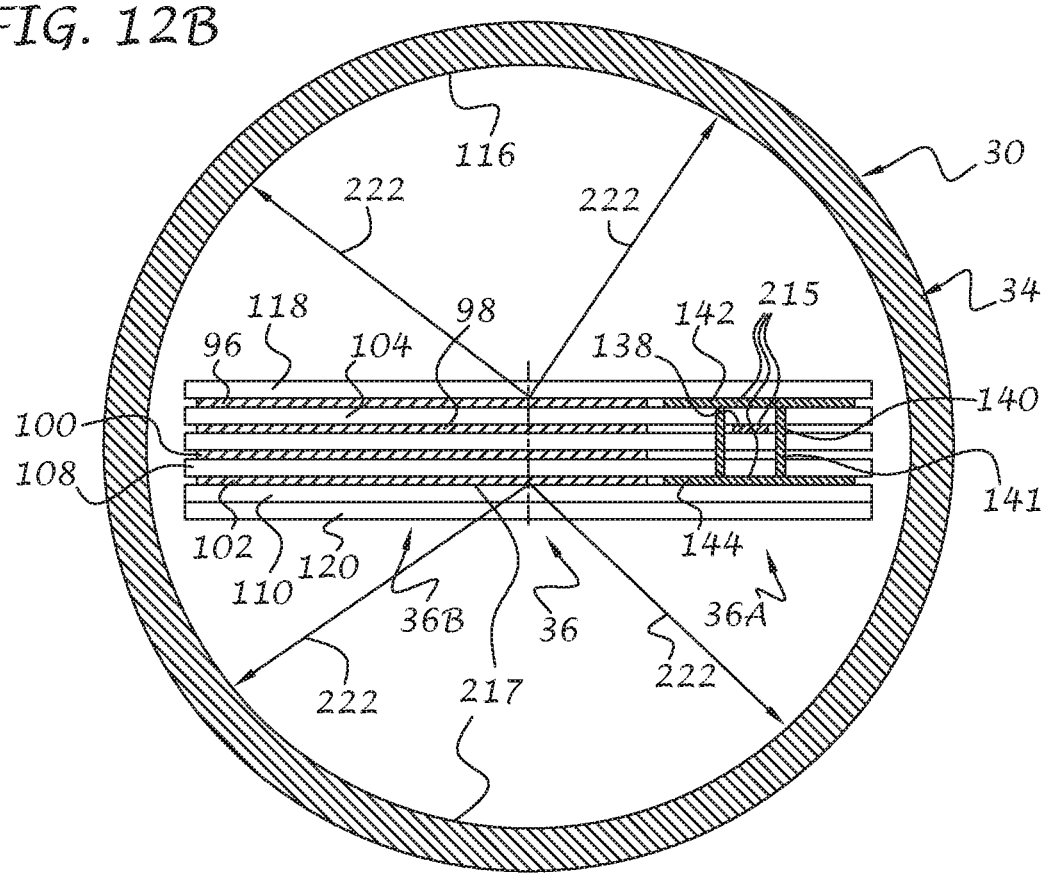
FIG. 12B is an enlarged sectional view of the first elongate electrode portion and unshielded electrode section of the second elongate electrode portion and schematically illustrating radiation of an signal therebetween during propagation of the energy pulse therealong.

With particular reference to FIGS. 12A and 12B, in order to further illustrate the invention, the first elongate electrode section 36A (FIG. 6) comprising the conductive signal trace or trace 138 (FIG. 7) and the surrounding ground planes 142, 144 and ground stitching 140, 141 form a first elongate electrode pair 215 (FIG. 12A) of the first shielded transmission line segment of the elongate measuring probe 30. Likewise, the second unshielded electrode section 36B (FIG. 6) with the inner electrode areas 96, 98, 100, and 102 (FIG. 7) together with the conductive inner surface 116 of the outer electrode 94 (FIG. 4) form a second elongate electrode pair 217 (FIG. 12B) of the second unshielded transmission line segment of the elongate measuring probe 30. The first and second elongate transmission line segments can be sequentially sliced into imaginary slices or segments dependent on time intervals of ΔT duration along the propagation direction of the electromagnetic pulse, including the "boomerang" effect previously described in accordance with the invention, which represent distance segments based on the velocity of the electromagnetic pulse propagating along the afore-mentioned electrode pairs of the shielded and unshielded transmission line segments. The propagation velocity is in turn dependent on the dielectric constant of the insulative substrate layers 104, 106, 108, and 110 (FIG. 7) in the shielded transmission line segment, and the dielectric constant of air, fluid, or solid material located in the inner annular measuring space or volume 114 (FIG. 4) of the unshielded transmission line segment.

The transmission time of each subsequent transmission of the electromagnetic signal preferably increases in multiples of ΔT, for example, to create the imaginary slices or segments through the elongate measuring probe 30 representative of distance traveled along the first and second elongate electrode pairs for multiple transmissions during a measurement cycle where data points associated with the localized impedance at each imaginary segment or slice can be gathered. The impedance value associated with the end of each transmission time or distance along the elongate measuring probe is dependent on the localized dielectric constant of the substrate material in the first shielded transmission line segment and the dielectric constant of air, fluid or solid material located in the inner elongate space 114 between the second elongate electrode pair of the second unshielded transmission line segment of the probe 30, at the imaginary sliced locations or segments. The impedance values are generated during pulse transmission and collected during reception of a return echo, where some of the energy of the electromagnetic pulse is reflected back to the electronic assembly, to determine the level of liquid and/or other measurable properties of the media within the inner elongate space 114.

As shown in FIG. 12A, the first elongate electrode pair or shielded transmission line segment 215 of the shielded electrode section 36A is of a generally coaxial configuration, although other configurations can be used without departing from the spirit and scope of the invention. When the pulse is located in the shielded electrode section 36A at any given point in time, the energy of the electromagnetic pulse radiates between the first elongate electrode pair 215, i.e. as represented by arrows 220 extending from the inner narrow conductive trace 138 to the surrounding ground planes 142 and 144, and stitched ground vias 140 and 141 via at least the material of the substrate layers 104, 106, and 108.

As shown in FIG. 12B, the second elongate electrode pair or unshielded transmission line segment 217 associated with the unshielded electrode section 36B is also of a generally coaxial configuration, although other configurations can be used without departing from the spirit and scope of the invention. When the pulse is located in the unshielded electrode section 36B, the energy of the electromagnetic pulse radiates between the second elongate electrode pair 217, i.e. as schematically represented by arrows 222 extending between the connected inner conductive signal planes 96, 98, 100, and 102 to the inner conductive surface 116 of the outer electrode portion 34, via air, liquid, or other materials located in the inner elongate space 114.

The value of the impedance at any location or period of time along the dual length of the measuring probe, i.e. the first length being associated with the first shielded transmission line segment 215 and the second length being associated with the second unshielded transmission line segment 217, can be approximated by the following formula:

$$\frac{C}{L} = \frac{2\pi k \epsilon_0}{\ln\left(\frac{b}{a}\right)} \quad (1)$$

Where: C is capacitance; L is unit length; k is the dielectric constant; $\epsilon_0$ is the dielectric permeability of free space (air in the space between the conductors=1); a is the inner radius of the outer electrode; and b is the outside radius of the inner electrode. Although the first elongate electrode pair 215 does not have a defined radius for either the inner or outer electrode, the radius of the inner electrode or first conductive trace 138 can be approximated by averaging the distance between the signal and ground surfaces of each transmission line segment. It will be understood that the impedance value can be determined by other formulae depending on the particular configuration of the shielded and unshielded transmission lines associated with the inner and outer electrode portions.

When the elongate measuring probe 30 is arranged generally vertically in a tank, and when liquid is located in the annular inner elongate space 114 between the inner electrode 96 and outer electrode 94, part of the elongate measuring probe will be filled with liquid and cause a change in impedance beginning at the air/liquid interface. The change in impedance creates the return echo, where some of the energy of the electromagnetic pulse is reflected back to the electronic assembly where it can be analyzed and determined whether the level of liquid has indeed been located, through known analysis techniques by examining the properties of the return echo, such as amplitude, area, and whether a return echo is expected at the determined distance along the waveguide and transmission line segments comprising the calibration trace and the electrode pairs, respectively.

Accordingly, each subsequent transmission during a measurement cycle captures a data point at a different location. For example, if the length of the calibration trace is 500 mm and the total length of the elongate measuring probe 500 mm, including 250 mm along the first shielded transmission line segment and 250 mm along the second unshielded transmission line segment, for a combined measuring length of 1,000 mm, and 1,000 transmissions of electromagnetic energy pulses or bursts are activated during a measurement cycle, the distance between data points will be approximately 1,000 mm per 1,000 transmissions, or one mm distance between data points. Of course, the amount of transmissions, as well as the lengths of the calibration trace and transmission line segments can greatly vary. If for example 2,000 transmissions over the 1,000 mm total length occur, the measurement resolution, or distance between data points, will be 0.5 mm. If 100,000 transmissions occur over the same length for example, 100,000 data points will be gathered with a resolution of 0.01 mm distance therebetween.

Furthermore, when the bursts of electromagnetic energy occur at a frequency of 2.4 GHz for example, which is within the capabilities of very low-cost microcomputers having an internal clock, the microcomputer 178 (FIG. 11) is used in conjunction with the analog components of the ETS module 216, to create first time intervals between actuating the RF receiver (RX) 224 for receiving adjacent data points in the nanosecond range, and second time intervals in the picosecond range beyond the nanosecond range of each subsequent RX time interval for actuating the transmitter (TX) 182, to thereby transmit the electromagnetic energy pulses at predetermined increases in timing intervals. Actuating the transmitter 182 picoseconds after action of the receiver 186, allows data collection even before the first electromagnetic energy pulse occurs, as described above, to thereby collect data before, during, and after transmission of the electromagnetic pulse.

Accordingly, resolution of the TDR transducer 10, 10A can greatly vary depending on the number of transmissions that will be actuated over the electronic length of the TDR transducer, including both the shielded and unshielded transmission line segments, which effectively doubles the length of the actual measuring probe 30 (FIG. 1). It will be understood that other units of measure can be used without departing from the spirit and scope of the invention.

A first calibration module 226 for generating a first calibration mark in the form of a first calibration return echo at a first location along the calibration trace 43 (FIG. 10) can be provided. Likewise, a second calibration module 228 can be provided for generating a second calibration mark in the form of a second calibration return echo at a second location along the calibration trace 43. Preferably, the first calibration mark is at an intermediate location along the length of the calibration trace 43, while the second calibration mark is at the end of the calibration trace 43 to mark the end of the calibration trace and the transition between the calibration trace and the elongate measuring probe 30.

The first and second calibration modules 226 and 228, respectively, provide selectable first and second discontinuities of predefined proportions to thereby selectively generate respective first and second calibration return echoes for example, during a calibration cycle, which can occur during each transmission, during each measurement cycle comprising a plurality of transmissions, or whenever it has been determined that a sufficient change in ambient temperature has occurred to affect the dielectric constant of the material to be measured or the clock timing from the microcomputer, and so on.

The first and second calibration echoes can be analyzed to determine the electronic distance therebetween, i.e. the electronically measured distance between the first and second calibration echoes, the slope between the echoes, the size and shape of the calibration echoes, the area under the calibration echoes, and so on, in order to correct for less accurate or inconsistent clock timing pulses associated with very low-cost microcomputers. Since the physical distance between the discontinuities is known, and the electronic distance can be measured, any discrepancy between the two values can be resolved to obtain highly accurate clock timing cycles that would exceed the accuracy of the clock pulses of much more expensive microcomputers or crystal oscillators. In this manner, the cost of the TDR transducer can be significantly lowered by specifying in most cases very low-cost components for the electronic assembly 32.

It will be understood that one or more of the first and second calibration modules can be eliminated, especially when the distance between the start of the calibration trace 365 to the first or second selectable discontinuity is physically known and can be electronically measured to thereby correlate any discrepancies.

In accordance with a preferred embodiment of the invention, since the second calibration module 228 is located at the end 206 (FIG. 10) of the calibration trace 43, it is advantageous to keep the second calibration module 228 and eliminate the first calibration module 226 since the longer distance between the beginning 204 of the calibration trace and the ending thereof would be expected to yield greater accuracy than the shorter distance between the first and second calibration modules. It will be further understood that more than two calibration modules can be provided when it is desirous to obtain a greater number of calibration points along the calibration trace 43.

A RF transmit pulse signal generator module 182 (FIGS. 9 and 11) is electrically connected to the ETS delay signal generator module 216 for imposing an electromagnetic energy pulse preferably comprising a radio frequency (RF) energy pulse, such a radar energy pulse, on the waveguide associated with the calibration trace 43, and on the first and second elongate transmission line segments of the measuring probe 30 in accordance with the timing intervals established by the ETS delay generator module 216 and the microcomputer 178, as discussed above.

A RF receive signal generator module 186 is electrically connected to the ETS delay generator module 216 for generating the RF receive pulse or signal to collect data related to the RF energy pulse imposed on the calibration trace 43 and the measuring probe transmission line segments, including return echoes due to anomalies or discontinuities, changes in dielectric constant, and electrical shorts between the electrodes as discussed above, to signify the end of the calibration trace and/or measuring probe, for example, in accordance with the timing intervals established by the ETS delay generator module 216 and the microcomputer 178.

A RF receiver module 230 includes sample and hold circuitry, such as a RF bias generator operably connected to a receive switch (not shown) associated with the RF receive pulse generator 186 for biasing the RF bias generator. The RF bias generator functions as a DC servo to maintain a constant bias on the receive switch, resulting in constant sensitivity of the receive switch to the sample pulses and the received data generated by the imposed RF energy pulse. The receive switch controls when data is received in accordance with the timing intervals established by the ETS delay generator module 216 and the microcomputer 178.

The RF receiver module 230 is operatively associated with the RF receive pulse module 186 to generate a second sample pulse from the primary sample pulse associated with the RF receive pulse module 186. The second sample pulse allows the system to use a second track and hold amplifier module (not shown) which greatly amplifies the received signal upon actuation of a sample pulse generator (not shown). The sample post generator is operably associated with the receive pulse module 186 and the receive switch module for greatly augmenting the received measurement data signal from the receive switch module.

Details of the RF receiver module 230, including the RF bias generator, second track and hold amplifier module, and the sample pulse generator module, will not be described as they can be constructed of known analog components arranged in a circuit or the like for executing their respective functions. Such modules or components preferably work in conjunction with the analog and/or digital circuitry associated with other modules of the electronic assembly 32, including the microcomputer 178 that interface with electronic components of the other modules or portions thereof for initiating and executing the functions of the RF receiver module 230 and its associated RF bias generator, track and hold amplifier module, and sample pulse generator module 186.

In accordance with a further embodiment of the invention, the receiver module 230, including the afore-described modules operably connected thereto, can comprise digital devices or components, and arranged in a known manner to accomplish their respective functions. Such devices or components can also work in conjunction with the microcomputer 178 and/or with other circuitry for accomplishing their various functions.

In accordance with yet a further embodiment of the invention, at least a portion of the receiver module 230, including associated modules described above, can be at least partially embodied as operating instructions associated with the microprocessor. Such instructions enable activation and deactivation of predefined ports associated with the microprocessor 178 for interfacing with the analog circuitry associated with other modules of the electronic assembly 32 and thus executing the equivalent functions of the RF receiver module 230 and its associated RF bias generator, track and hold amplifier module, and sample pulse generator module.

The microcomputer 178 can also be programmed with dedicated ports to generate one or more of the sample pulses, activate the second track and hold amplifier module, and/or include programmed software modules within the memory (not shown) of the microprocessor 178 for accomplishing similar purposes or functions.

A buffer amplifier module 232 is also operatively associated with the sample and hold module amplifier and includes a high impedance input buffer amplifier for amplifying the received signal.

An analog low pass filter module 234 is operably connected to the A/D converter 188 (FIG. 9) of the microcomputer 178, where the received signals are digitized and further processed.

A temperature sensor module 236 is operatively associated with the microcomputer 178 for providing temperature compensation due to ambient temperature fluctuations to the system, which not only affects the mechanical dimensions of the compensation trace and the elongate electrodes of the measuring probe, but also the dielectric constants of the materials of the TDR probe construction as well as the medium or material(s) to be measured.

A D/A converter module 238 is also operatively associated with the microcomputer 178 for converting a digital control signal output from the microcontroller to an analog control signal that can be used for operating one or more of the analog modules. The D/A converter module 238 can also be used for generating an analog signal from digital information stored in memory indicative of media or material condition, to thereby permit use of the TDR transducer with analog indicator means, including visual and audio devices such as one or more indicator lights, gauges, buzzers, and so on, as represented by the display 242 in FIG. 11. It will be understood that the D/A converter module 238 can be eliminated when only digital signals and/or digital indicator means, such as digital displays 242 or the like, will be used.

A voltage reference module 240 is operatively associated with the D/A converter module 238 for creating precision analog signals from the digital signal output of the microprocessor that can be used for operating one or more of the analog modules and/or generating an analog signal indicative of material condition, such as liquid level when the RF transducer is embodied as a liquid level measurement transducer. Other material conditions can also be communicated in analog form, as discussed above, for permitting a user, system, and so on, to receive, view, and/or interpret the information related to the material condition within the measuring volume of the elongate measuring probe 30 and perform further steps if needed.

Whether the output signals reflective of the material condition, such as liquid level or linear movement, be analog or digital, a hard-wired display 242 and/or a remote system or device, such as a personal computer, laptop, smart phone, tablet, or the like (not shown), linked wirelessly with a RF transceiver 244, can be used to wirelessly relay the information indicative of liquid level, dielectric constant, or other condition of the material within the measuring volume 114 between the elongate electrodes to a remote system or device.

In operation, an electromagnetic energy pulse is generated by the electronic assembly 32, as described above, and propagates along the first shielded transmission line segment (FIG. 12A) of the inner electrode portion 36 between the first elongate electrode pair defined by the first narrow conductive trace 138 on the substrate 106 and the surrounding ground planes 142 and 144 on substrates 104 and 110, respectively, and the ground vias 140 and 141 stitched together and located on either side of the trace 138 with the substrate material functioning as the dielectric material between the conductors so that little to no signal loss occurs. Once the electromagnetic energy pulse clears the ground planes 142 and 144 and begins to propagate along the conductive planes, areas or electrodes 96, 98, 100, and 102 electrically connected together, the ground switches to the second unshielded transmission line segment 217 (FIG. 12B), including the second elongate electrode pair with the outer elongate electrode portion 34 (FIG. 6) and the conductive areas 96, 98, 100, and 102, such that the electromagnetic energy pulse radiates between the unshielded electrode section 36B and the inner conductive surface 116 of the outer elongate electrode portion 34, with the dielectric material located in the inner elongate space or volume 114 therebetween, including air, vapor, liquid, and other materials to be measured.

In this manner, liquids or other materials with a relatively high dielectric constant have no effect on bottom-mounted TDR transducer configurations such as TDR transducer 10. Likewise, for top-mounted TDR transducers 10A or the like, the return echo is not affected by the high dielectric materials. As described above, when the interface between air or vapor and liquid level or other material level is reached by the energy pulse, at least a portion of the pulse is reflected back toward the first electronic assembly for analysis in the form of a return echo. The electronic pathway back is in the opposite direction, i.e. the return echo travels back along the second elongate electrode pair including the unshielded electrode section 36B (FIG. 6) and the outer elongate electrode portion 34 until the first narrow conductive trace and ground planes 142 and 144 are reached. The return echo will then continue to return to the electronic assembly 32 via the first shielded electrode section of the first elongate electrode pair, without further signal loss due to the high dielectric constant of the liquid or material being measured.

Figure 7A:
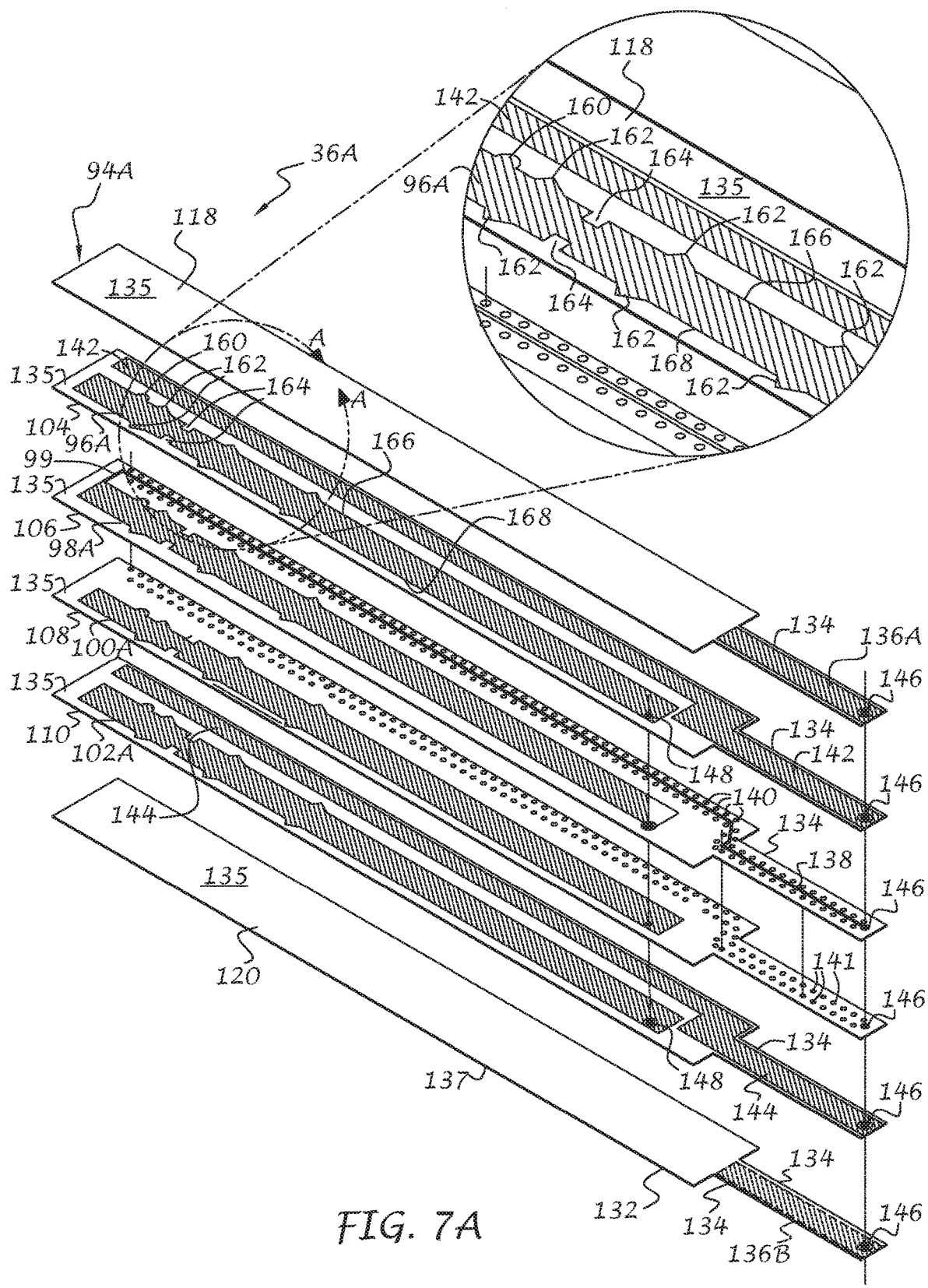
FIG. 7A is a view similar to FIG. 7 showing a second electrode portion with substrate layers formed on the first faces thereof in accordance with a further exemplary embodiment of the invention, and illustrating an enlarged section of unshielded elongate conductors formed with exemplary anomalies at one or more predetermined positions or distances therealong to produce one or more predefined return echoes at measurable transmission/reflection times to calibrate the TDR transducer.

Referring now to FIG. 7A, and in accordance with a further embodiment of the invention, an inner electrode portion 36A includes an inner electrode body in the form of a second PCB 94A. The second PCB 94A, includes conductive strips 96A, 98A, 100A, and 102A formed on different substrate layers 104A, 106A, 108A, and 110A, respectively, of the second PCB 94A, can include one or more calibration protrusions, such as lateral protrusions or dog ears 160 and/or 162 of different shapes, such as the semi-circular shape of the protrusion 160 and the generally triangular shape of the protrusion 162. Moreover, in addition to the lateral protrusions, or as an alternative thereto, one or more laterally extending gaps 164 can be formed along the length of the conductive strips 96A, 98A, 100A, and 102A at one or more discrete positions to create anomalies that result in predictable return echoes since the physical location of each protrusion and/or gap is known and the electronic location of each protrusion and/or gap can be measured. In this manner, if the differential time between return echoes associated with any two conductive protrusions, gaps, or between the beginning or end of the conductive calibration trace 43 (FIG. 10) and one or more of the conductive strip anomalies 160, 162, and/or 164 is different than expected, the dielectric constant of the material being measured can be updated, so that the actual time of travel of the energy pulse between known anomalies can be corrected, to thereby correct the timing function as described above, and thus the time to the air/liquid interface or the like and, consequently, determine with greater accurately the level of liquid in the tank or the like.

It will be understood that the one or more calibration protrusions 160 and/or 162 and/or one or more narrow areas created by one or more gaps 164 can be located at a single position along one longitudinal edge 166 or 168 of the conductive strips 96A, 98A, 100A, and 102A, at two or more discrete positions along one of the longitudinal edges, or at two or more predetermined positions along both longitudinal edges. The protrusions and/or gaps associated with one longitudinal edge 166 or 168 can be aligned with the protrusions and/or gaps associated with the other longitudinal edge '68 or 166, respectively. Even a single gap or protrusion can form a discernible return echo of a first amplitude, while a pair of aligned gaps or protrusions of the same size can form a return echo with a second amplitude greater than the first amplitude.

Accordingly, calibration echo points can be formed along the unshielded electrode section 36B of the measuring probe 30 by providing wider or narrower conductive trace portions or segments at predetermined discrete locations, such calibration echo points being used with their known locations and relative travel times between the commencement of the energy pulse and the reception of the calibration return echo(s) associated therewith, to determine or update the dielectric constant of the material being measured, and correct the travel time to and from the air/liquid interface with great accuracy. Although a particular number of substrate layers and conductive strips are shown, it will be understood that more or less layers can be provided without departing from the spirit and scope of the invention.

Highly accurate level measurements are possible with the present invention. For a liquid level transducer, material above the liquid can be in a gaseous state, for example, when a single liquid level is being measured. In addition, the material above the liquid can be in a liquid state for measuring the level of or interface between two or more immiscible liquids. As an example, it may be desirable to measure the level of both diesel fuel and water that may be located in a fuel tank. Likewise, it is within the purview of the invention to measure the level or height of materials having different dielectric constants, as well as measuring the dielectric constants of known or unknown materials based on the velocity of the electrical electromagnetic energy pulse traveling through the material(s) being measured.

The default reference material and phase of that material between the elongate electrodes in the absence of liquid or other material to be measured will largely determine the nominal impedance value (NIV) of the elongate measuring probe 30 that is used as a reference at any particular location along the probe length absent any anomalies that may occur to change that value, such as the presence of liquids, solids, powders, and so on, as well as the presence or absence of integral anomalies, such as the conductive protrusions and/or gaps formed on one or more of the conductive strips 96, 98, 100, and 102 previously described.

In accordance with one aspect of the invention, the nominal impedance value (NIV) can range between above 0 (zero) Ohms and below 377 Ohms for the elongate measuring probe 30 coaxial transmission line. The upper limit is the impedance of free space, and therefore it is expected that the TDR transducer 10 of the invention would operate below that level. However, in order to facilitate development, testing, and calibration of the TDR transducer 10, a NIV of 50 Ohms has been selected by way of example and practicality, since this value is the standard transmission line impedance for RF devices as well as the standard or baseline impedance for RF test equipment used during development or testing of such devices. Since the majority of RF test equipment employs a nominal impedance of 50 Ohms, the test equipment can be directly connected to the electronic assembly 32 of the TDR transducer 10 without the need for impedance transformation adaptors during development, testing, and calibration.

Preferably, the NIV of 50 Ohms is maintained in the shielded transmission line segment of the measuring probe 30, as well as in the unshielded transmission line segment thereof, in the presence of air or atmosphere. For example, the NIV of 50 Ohms in the shielded section can be obtained by selecting an appropriate material for the insulative substrates of the multi-layer PCB or the like, i.e. the dielectric constant and thickness of the insulative substrate material, together with the surface areas of the stacked electrodes and the number of stacked electrodes. With a NIV of 50 Ohms created in the shielded transmission line segment of the inner electrode portion 36, as well as a NIV of 50 Ohms created in the unshielded transmission line segment of the inner electrode portion 36 together with the outer electrode portion 34 and the measuring volume 114 therebetween filled with air (as the dielectric constant being measured, for example), no change in impedance of the transducer occurs as the energy pulse travels through the spacer 150, the housing 46, and other structure and materials associated with connectors, bulkheads, pressure seals, O-rings, gaskets, spacers, potting material, various housing features, or the like, between the tank and the outside world. Accordingly, the painstaking time and effort, along with the relatively high costs associated with impedance matching the various components under different mounting conditions and configurations of the TDR transducer 10 is eliminated as well as the accommodating nuisance echoes associated with even a slight impedance mismatch.

It will be further understood that a particular NIV or range of NIV's can be used without departing from the spirit and scope of the invention. For example, the use of 33 Ohms as the nominal impedance value of the elongate measuring probe 30 allows the greatest power handling capability, while the use of 75 Ohms as the nominal impedance value results in the least amount of signal loss. Accordingly, the particular nominal impedance value can greatly vary without departing from the spirit and scope of the invention.

In accordance with a further embodiment of the invention, a conductive calibration trace (not shown), similar to the conductive calibration trace 43 previously described, can be provided on one or more of the substrate layers and/or additional substrate layers of the second PCB 94 associated with the second elongate electrode portion 36. In this manner, calibration errors due to anomalies associated with the first PCB 35, such as the placement of electronic components such as processors, resistors, capacitors, transducers, memory chips, timers, ground planes, conductive traces between component connecting pads or through-holes, the size and thickness of the PCB 35 and intermediate layer features, as well as mounting hardware and other considerations, which may cause interference with the conductive calibration trace 43, can be eliminated so that no errors are introduced by the PCB 35 due to changes in impedance that might otherwise occur.

Moreover, although the electromagnetic energy pulse generator, transmitter, and receiver discussed above are configured as particular embodiments to operate in a particular manner that generates and transmits a particular energy pulse along the TDR transducer measuring probe and receive one or more of the reflected energy pulses, the present invention is not limited thereto, but can include any suitable analog and/or digital circuitry implemented entirely by electronic components or a combination of electronic components and software, as well as other electronic means for generating, transmitting, and receiving one or more energy pulses on a waveguide, e.g. a single conductor line and/or a transmission line, e.g. a pair of conductors separated by insulating material, such as coaxial or non-coaxial conductors, balanced or unbalanced conductors, plates, and/or traces, in the radio range of the electromagnetic energy spectrum, or in any other suitable frequency, frequencies, and/or range of frequencies with a predetermined electromagnetic energy pulse, including without limitation, a burst, ramp, wave or waveform such as a sine wave, square wave, triangle wave, sawtooth wave, portions thereof, such as the leading and/or trailing edge and/or middle portions of the waveform, arbitrary waveforms, and/or combinations thereof, as well as one or more changes in amplitude and/or frequency of the energy pulse.

Moreover, in accordance with a further embodiment of the invention, the transmit and/or receive sections and/or a substantial portion of the electronic assembly normally associated with the PCB 35, can be associated with one or more of the outer substrate layers 118 and 120 of the PCB 94 for example, to further increase operating efficiency, reduce manufacturing costs, and eliminate any errors or changes in impedance that might be associated with the PCB 35, the connection between the PCB 35 and PCB 94, as well as the electronic components and conductive trace configurations associated with the PCB 35.

In accordance with another embodiment of the invention, the PCB 94 can be constructed in relative short lengths that do not raise the cost of manufacture, with each second PCB 94 being electrically and mechanically connectable together to lengthen the probe 30 without incurring extra expense associated with longer PCB manufacture. Connecting the second PCB's together also enables easier processing of the electronic components during assembly. The connected PCB's can be sealed to protect exposed conductive connection conductive traces.

Furthermore, in accordance with a further embodiment of the invention, the elongate measuring probe 30 comprises a flex circuit construction so that the elongate measuring probe 30 can accommodate a large variety of tank sizes, and configurations. By way of example, the flexible measuring probe of the TDR transducer of the present invention can be installed in tanks through filler tubes or other capped openings normally used for filling the tanks with fuel, as well as other applications where electrodes comprising multi-layer PCB's of considerable length would be both cost-prohibitive and limited to a maximum length, which may be too restrictive for the broader applications of the present invention as described herein or that may become apparent upon reading the present disclosure. Spacers or standoffs (not shown) can be located in the inner elongate space 114 between the inner electrode portion 36 and the outer electrode portion 34 to maintain a consistent distance therebetween The outer elongate electrode portion 34 and the inner elongate electrode portion 36 can be constructed of a flexible insulative substrate material, such as polyimide or other suitable flexible insulative materials, and flexible conductive materials, such as copper, aluminum, or other conductive materials either in thin sheet form or deposited onto the flexible substrate using well-known manufacturing techniques. The outer electrode portion 34 can be constructed of a single layer of flexible insulative material with a layer of flexible conductive material attached thereto, or the conductive layer may be sandwiched between the flexible substrates to protect the delicate nature of the conductive layer, while providing a precisely controlled insulative layer with a predictable dielectric constant to prevent the generation of undesirable return echoes. Likewise, the electrode portion 36 can be constructed with similar alternating layers of flexible insulative substrate material and conductive layers connected to the substrate layers with conductive trace patterns similar to the multilayer PCB embodiments previously described.

In accordance with a further embodiment of the invention, the outer flexible electrode portion 34 need not completely surround the inner flexible electrode portion 36 in order to propagate electromagnetic pulses through the inner electrode assembly in a first direction and between the flexible inner electrode assembly and outer electrode portion 34, so long as a gap between both electrodes is conducive to propagation of the electromagnetic pulse and return echo between the electrodes, or vice-versa. Accordingly, the electrode portion 34 and electrode portion 36 can comprise a relatively flat configuration, so long as structure is provided to maintain spacing therebetween and allow flow of liquid to be measured into the spacing and reverse flow therefrom.

The flexible nature of the conductive elongate measuring probe 30 is capable of accommodating tanks with unconventional tank geometries having difficult-to-reach areas, and where it may be desirable to install the TDR transducer along one or more tank walls to minimize the inner space taken by the transducer and thus increase storage space for the fuel. The elongate flexible measuring probe 30 can be installed through conventional openings formed in tanks where a variety of prior art fuel senders can be installed using standard mounting arrangements, including but not limited to, conventional 4-hole or 5-hole mounting flanges, various sizes of NPT openings formed in tanks, such as ¾-Inch NPT or 1-inch NPT threaded openings to engage similarly sized NPT threaded mounting heads of the transducer 10, as shown in FIG. 1. It will be understood that the particular mounting arrangement, location, and orientation of the TDR transducer 10 with respect to a tank or container can greatly vary without departing from the spirit and scope of the invention.

In addition, in accordance with yet another embodiment of the invention, the conductive trace at the proximal or low liquid level end of the second PCB or flexible electrode 94 can be modified to lower the impedance to yield an echo, the echo allowing reading the liquid level all the way to the end of the measuring probe 30 and also simplifying calibration during production. One example of the modification is using a short copper section on the PCB from the probe conductive trace toward the ground conductive trace.

Moreover, in accordance with a further embodiment of the invention, the distal end of the elongate measuring probe 30 can be terminated with an electronic component (not shown), such as a standard surface-mount resistor or a custom part constructed inside the substrate layers of the PCB 94, such as a film applied during PCB construction, resulting in reduced or eliminated nuisance echoes that otherwise might reverberate from the distal end of the probe to the electronic assembly 32. When the transmitted energy reaches the resistor or other part or component at the distal end of the probe, the energy is sufficiently dissipated to prevent or reduce reflection thereof to the proximal end of the elongate measuring probe. With this embodiment, quicker measurements are possible since it is no longer required to wait for the reverberations to fade out prior to transmitting another energy pulse or series of pulses during a measurement cycle.

Although the invention has been described in terms of mechanical fastening for electrically and mechanically connecting the outer and inner electrodes to the PCB 35 of the electronic assembly 32, it will be understood that other connection means can be used, including but not limited to, adhesive bonding with conductive adhesive, soldering, brazing, surface welding, and so on.

As mentioned above, it is within the purview of the invention to allow the measurement of two or more immiscible liquids, such as the level of both diesel fuel and water that may be located in a fuel tank. Likewise, the present invention can measure the level or height of materials having different dielectric constants, measuring the dielectric constants of materials based on the velocity of the electrical electromagnetic energy pulse traveling through the material(s) being measured, as well as linear movement between two objects.

As described above, the conductive calibration trace 43 and electrodes together comprise a guided wave radar system with a total combined length for guiding the electromagnetic pulses therealong from the beginning of the waveguide, through the first elongate transmission line segment, to the end of the second elongate transmission line segment being greater than the length of the measuring electrode from the proximal to the distal end thereof. The electromagnetic pulse preferably comprises a portion of a square wave pulse or the like in the radar frequency range of the electromagnetic spectrum. The radar wave typically travels at the speed of light when unimpeded, e.g. in a perfect vacuum, but due to differences in the dielectric constant of air and various materials, the radar wave can actually slow down to half the speed of light or less, depending on the dielectric constant of the material or fluid through which the radar wave propagates.

Accordingly, although the length of the elongate measuring probe 30 is relatively long, the duration of the radar wave is very short and can thus be transmitted thousands of times per second, for example, during a single measurement cycle. Preferably, several measurement cycles with thousands of transmissions of the radar pulse are performed to obtain data that can be analyzed for determining liquid level or other measurable characteristics of the medium as well as the interface between immiscible liquids or other materials.

It will be understood that the various measured and calculated values associated with material properties as described above are given by way of example only and are not intended to be an exhaustive list. Software techniques and methods for accurately determining the liquid level, volume, dielectric constant, and other tank conditions as discussed above can be implemented in electronic means, including analog circuitry, digital circuitry, in computer hardware, firmware, software, and/or combinations thereof. The electronic means, including the techniques and methods for operating the TDR transducer as described above, may be implemented in a computer program product tangibly embodied in a machine-readable storage device for execution by a programmable processor; and the above-described methods may be performed by a programmable processor executing a program of instructions to perform functions by operating on input data and generating output. Further electronic means may advantageously be implemented in one or more computer programs that are executable on a programmable system including at least one programmable processor coupled to receive data and instructions from and transmit data and instructions to a data storage system, at least one input device, and at least one output device. Each computer program may be implemented in a high level procedural or object-oriented programming language, or in assembly or machine language, which can be compiled or interpreted. Suitable processor means include, by way of example, both general and special purpose microprocessors. Generally, a processor receives instructions and data from read-only memory and or RAM. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and so on. Any of the foregoing may be supplemented by, or incorporated in, specially designed application specific integrated circuits (ASICs).

Although particular embodiments of the TDR transducer have been shown and described, it will be understood that other mounting arrangements as well as other sensing probe configurations can be used without departing from the spirit and scope of the invention.

It will be understood that the term "preferably" as used throughout the specification refers to one or more exemplary embodiments of the invention and therefore is not to be interpreted in any limiting sense.

It will be further understood that the term "connect" and its derivatives refers to two or more parts capable of being attached together either directly or indirectly through one or more intermediate members.

In addition, terms of orientation and/or position, such as upper, lower, proximal, distal, first, second, inner, outer, vertical, horizontal, and so on, as well as their derivatives as may be used throughout the specification denote relative, rather than absolute, orientations and/or positions. Thus, where the terms "lower" and "upper" are used to describe relative positions of features, when the TDR transducer is inverted, the "lower" feature would be the "upper" feature, and vice-versa.

It will be appreciated by those skilled in the art that changes can be made to the embodiments described above without departing from the broad inventive concept thereof. By way of example, although the invention has been shown and described with an isolated electrode or transmission line section being associated with the second, or inner, electrode, it will be understood that the first or outer probe can comprise one or more electrically shielded or isolated electrode or transmission line sections and one or more non-shielded probe or electrode sections to isolate a portion of the electromagnetic wave and/or return echo from the outside environment as it propagates in one direction, and expose the electromagnetic wave to the environment as it propagates in the same or opposite direction for the advantages as described above.

Moreover, although the above-described invention shows shielded and unshielded electrode sections constructed so that propagation of the electromagnetic energy pulse is shielded in one direction and unshielded in an opposite direction, it will be understood that the shielded and unshielded sections can be arranged so that the energy pulse can propagate in the same direction in both the shielded and unshielded sections without departing from the spirit and scope of the invention. It will be understood, therefore, that this invention is not limited to the particular embodiments disclosed, but is intended to cover modifications within the spirit and scope of the present invention as defined by the appended claims.

What is claimed is:

1. A time domain reflectometer (TDR) transducer for determining at least one property of a material, the TDR transducer comprising:
    a first electrode portion including a first conductive body;
    a second electrode portion comprising a first shielded electrode section and a second unshielded electrode section, wherein the first shielded electrode section and second unshielded electrode section extend generally parallel to each other within and along a length of the first electrode portion;
    an inner measuring volume located between the first conductive body and the second unshielded electrode section for receiving material to be measured; and
    the first shielded electrode section being isolated from the first conductive body to thereby form a first shielded transmission line segment with a first nominal impedance value unaffected by the presence or absence of material to be measured in the inner measuring volume, such that a signal propagates virtually unimpeded along the first shielded transmission line segment in a first direction and a return echo portion of the signal propagates virtually unimpeded therealong in a second direction opposite to the first direction to thereby reduce or eliminate deterioration of the signal and return echo therealong;
    wherein the second unshielded electrode section is in conjunction with the first conductive body to thereby form a second, unshielded transmission line segment; and wherein the first conductive body comprises an outer hollow cylindrically shaped body extending substantially the length of the first and second transmission line segments.

2. A TDR transducer according to claim 1, wherein:
    the second unshielded electrode section being electrically connected to the first shielded electrode section and spaced from the first conductive body by the inner measuring volume; and
    the first conductive body together with the second unshielded electrode section and the inner measuring volume forming a second unshielded transmission line segment with a second nominal impedance value when the inner measuring volume is void of material to be measured;
    wherein a third impedance value different from the second nominal impedance value occurs when the material to be measured is present in the inner measuring volume, such that a portion of the signal in electrical communication with at least an interface of the material to be measured in the inner measuring volume is reflected as a return echo through the second unshielded transmission line segment and the first shielded transmission line segment for determining the at least one property of the material.

3. A TDR transducer according to claim 2, wherein the first nominal impedance value of the first shielded transmission line segment is approximately equal to the second nominal impedance value of the second unshielded transmission line segment to thereby minimize or eliminate undesired return echoes when the signal transitions from the first shielded transmission line segment to the second unshielded transmission line segment.

4. A TDR transducer according to claim 2, further comprising an electronic assembly including:
    a signal generator for generating a signal;
    a signal transmitter electrically connected to the signal generator and to the first shielded transmission line segment for transmitting the generated signal along the first shielded transmission line segment and along the second unshielded transmission line segment; and
    a receiver electrically connected to the first shielded transmission line for receiving a return echo generated when the signal reaches an anomaly associated with the inner measuring volume to thereby measure at least a time period between transmission of the signal and receipt of the return echo to determine the at least one material property;
    wherein the second unshielded transmission line segment has a first end connected to the first shielded transmission line segment and a second end spaced therefrom.

5. A TDR transducer according to claim 2, wherein the second electrode portion comprises:
    a printed circuit board (PCB) adapted for electrical connection to electronic means for generating and transmitting a signal and receiving a return echo, and including:
    a plurality of substrate layers of insulating material connected together;
    a conductive signal trace formed on one of the plurality of substrate layers;
    at least one signal plane formed on one of the plurality of substrate layers and electrically connected to the conductive signal trace; and
    at least one ground plane formed on one of the plurality of substrate layers;
    wherein the at least one signal trace, the at least one signal plane, and the at least one ground plane are arranged to define the first shielded electrode section and the second unshielded electrode section.

6. A TDR transducer according to claim 5, further comprising:
    a housing adapted for connecting to a wall of a container;
    a measuring probe having a proximal end connected to the housing and a distal end spaced therefrom for extending into an inner space of the container, with the first and second shielded transmission line segments extending from the proximal end of the measuring probe toward the distal end thereof;
    each substrate layer comprising:
    a first measuring portion; and
    a second connecting portion extending from the first measuring portion and being positioned inside the housing, the second connecting portion being narrower than the first measuring portion and being adapted for connection to the electronic assembly;
    wherein the first shielded electrode section extends along the second connecting portion and along the first measuring portion to thereby bypass one or more anomalies that may be associated with the housing and the measuring probe and thus maintain the first nominal impedance value.

7. A TDR transducer according to claim 5, wherein the first shielded electrode section comprises:
the conductive signal trace being formed on a first substrate layer of the plurality of substrate layers and having a proximal end adapted for electrical connection to the electronic means, the conductive signal trace having a distal end spaced from the proximal end thereof;
the at least one ground plane comprising a first ground plane formed on a second substrate layer of the plurality of substrate layers above the first substrate layer such that the conductive signal trace is spaced from the first ground plane by the second substrate layer, with the first ground plane aligned over the conductive signal trace;
the at least one ground plane further comprising a second ground plane formed on a third substrate layer of the plurality of substrate layers below the first substrate layer such that the conductive signal trace is spaced from the second ground plane by the first substrate layer, with the conductive signal trace aligned over the second ground plane;
wherein the signal radiates between the conductive signal trace and the first and second elongate ground planes through at least the first and second substrate layers, respectively, as the signal propagates along the first shielded transmission line segment to thereby isolate the signal from the outer conductive body of the first electrode portion and, together with a dielectric constant of each of the first and second substrate layers, maintain the first impedance value throughout the length of the first shielded transmission line segment independent of the presence or absence of the material to be measured in the inner measuring volume.

8. A TDR transducer according to claim 7, wherein the second unshielded electrode section comprises:
the at least one signal plane includes a first signal plane formed on the first substrate layer and being electrically connected to the distal end of the elongate signal trace, the first signal plane having a width that is greater than a width of the elongate signal trace and being located outside of the first and second ground planes;
the first elongate conductive body of the first elongate electrode being connectable to electrical ground, such that the signal switches from radiating between the conductive signal trace and the first and second ground planes to radiating between the first signal plane and the first elongate conductive body across the inner elongate measuring volume of the second elongate transmission line segment.

9. A TDR transducer according to claim 8, wherein the at least one signal plane of the second unshielded electrode section further comprises:
a second signal plane formed on the second substrate layer adjacent to the first ground plane and extending parallel therewith;
a third signal plane formed on the third substrate layer adjacent to the second ground plane and extending parallel therewith; and
a fourth signal plane formed on a fourth substrate layer located between the first and third substrate layers, the fourth signal plane being in alignment with the first, second, and third signal planes;
each of the first, second, third, and fourth signal planes being electrically connected together and configured along with the first elongate conductive body and the inner measuring volume to form the second unshielded transmission line with the second nominal value approximately equal to the first nominal value of the first shielded transmission line in the absence of material to be measured in the inner measuring volume.

10. A TDR transducer according to claim 2 for determining a level of liquid in an inner space of a tank bounded by an upper wall, a lower wall spaced therefrom, and at least one side wall extending therebetween, and comprising:
a mounting head adapted for connecting to at least one of the upper and lower walls of the tank;
a measuring probe having a proximal end connected to the mounting head and a distal end spaced therefrom for extending into the inner space of the tank, with the first and second shielded transmission line segments extending from the proximal end of the measuring probe toward the distal end thereof;
the first conductive body of the first electrode portion comprising an outer electrode having an electrically conductive outer tube with a proximal end thereof connected to the mounting and a distal end thereof spaced from the mounting head for location within the inner space of the tank; and
the second electrode portion comprising an inner electrode portion located within the outer tube generally coaxial therewith and spaced therefrom by the inner measuring volume.

11. A TDR transducer according to claim 10, wherein the mounting head is adapted for connection to the lower wall of the tank such that the first shielded transmission line segment extends upwardly toward the upper wall of the tank and the second unshielded transmission line segment extends downwardly toward the lower wall of the tank, such that a signal propagates upwardly virtually unimpeded along the first shielded transmission line segment while maintaining the first nominal impedance when a liquid with a high dielectric value is located in the tank, and thus in the inner measuring volume; and further wherein the electromagnetic energy boomerangs downwardly along the second unshielded transmission line segment until reaching the liquid with high dielectric value to thereby generate the return echo.

12. A TDR transducer according to claim 1, wherein:
the first shielded transmission line segment is adapted to receive a signal generated and transmitted therealong by a signal generator and transmitter in a first propagation direction to electrically isolate the signal from the first electrode portion, thereby preventing signal loss and change in the first nominal impedance value along the first shielded transmission line segment independent of the presence or absence of material to be measured within the inner measuring volume; and
the second unshielded transmission line segment is adapted to receive and propagate the signal therealong in a second propagation direction upon clearing the first shielded transmission line segment, such that the signal radiates between the first conductive body and the second unshielded electrode section across the inner measuring volume while traveling in the second propagation direction to thereby expose the signal to at least one anomaly associated with a material to be measured positioned in the inner measuring volume to thereby generate one or more return echoes that propagate in reverse along the second unshielded transmission line segment in the first propagation direction and the first shielded transmission line segment in the second propagation direction, thereby electrically isolating the one or more return echoes from the first conductive body, for reception by a receiver to thereby determine at least one property of the material to be measured.

13. A TDR transducer according to claim 12, wherein:
the first shielded transmission line segment has a proximal end electrically connected to the generator, transmitter, and receiver and a distal end electrically connected to the first end of the second unshielded transmission line segment;
the second unshielded transmission line segment extends from the distal end toward the proximal end of the first shielded transmission line parallel with the first shielded transmission line segment, such that the first propagation direction is parallel with, but opposite to, the second propagation direction to thereby create a first boomerang effect when the energy pulse travels in the first propagation direction of the first shielded transmission line segment, transitions to the second unshielded transmission line segment, and travels in the second propagation direction of the second unshielded transmission line segment.

14. A TDR transducer according to claim 13, wherein when the signal is exposed to the material to be measured in the inner measuring volume associated with the second unshielded transmission line segment, the resulting return echo travels in the first propagation direction along the second unshielded transmission line segment, transitions to the first shielded transmission line segment, and travels in the second propagation direction along the first shielded transmission line segment to thereby create a second boomerang effect.

15. A TDR transducer according to claim 14, wherein the transducer is configured to determine a level of liquid in an inner space of a container bounded by an upper wall, a lower wall spaced therefrom, and at least one side wall extending therebetween, and comprising:
a housing adapted for connecting to at least one of the upper and lower walls of the container;
a measuring probe having a proximal end connected to the housing and a distal end spaced therefrom for extending into the inner space of the container, with the first and second shielded transmission line segments extending from the proximal end of the measuring probe toward the distal end thereof;
the first conductive body of the first electrode portion comprising an outer electrode having an electrically conductive outer tube with a proximal end thereof connected to the housing and a distal end thereof spaced from the housing; and
the second electrode portion comprising an inner electrode portion located within the outer tube generally coaxial therewith and spaced therefrom by the inner measuring volume.

16. A TDR transducer according to claim 15, wherein the inner electrode portion comprises:
a printed circuit board (PCB) electrically connected to the electronic assembly, and including:
a plurality of substrate layers of insulating material connected together;
a conductive signal trace formed on one of the plurality of substrate layers;
at least one signal plane formed on one of the plurality of substrate layers and electrically connected to the conductive signal trace; and
at least one ground plane formed on one of the plurality of substrate layers;
wherein the at least one signal trace, the at least one signal plane, and the at least one ground plane are arranged to define the first shielded electrode section and the second unshielded electrode section.

17. A TDR transducer according to claim 16, wherein each substrate layer comprises:
a first measuring portion; and
a second connecting portion extending from the first measuring portion and being positioned inside the housing, the second connecting portion being narrower than the first measuring portion and being electrically connected to the electronic assembly;
wherein the first shielded electrode section extends along the second connecting portion and along the first measuring portion to thereby bypass one or more anomalies that may be associated with the housing and the measuring probe and thus maintain the first nominal impedance value.

18. A TDR transducer according to claim 17, wherein the first shielded electrode section comprises:
the conductive signal trace being formed on the first measuring portion of a first substrate layer of the plurality of substrate layers and having a proximal end extending along the second relatively narrow connecting section in electrical connection to the electronic assembly, the conductive signal trace having a distal end spaced from the proximal end thereof;
the at least one ground plane comprising a first ground plane formed on the first measuring portion of a second substrate layer of the plurality of substrate layers above the first substrate layer such that the conductive signal trace is spaced from the first ground plane by the second substrate layer, with the first ground plane aligned over the conductive signal trace;
the at least one ground plane further comprising a second ground plane formed on the first measuring portion of a third substrate layer of the plurality of substrate layers below the first substrate layer such that the conductive signal trace is spaced from the second ground plane by at least the first substrate layer, with the conductive signal trace aligned over the second ground plane;
wherein the signal radiates between the conductive signal trace and the first and second elongate ground planes through at least the first and second substrate layers, respectively, as the signal propagates along the first shielded transmission line segment to thereby isolate the signal from the outer conductive body of the first electrode portion and, together with a dielectric constant of each of the first and second substrate layers, maintain the first impedance value throughout the length of the first shielded transmission line segment independent of the presence or absence of the material to be measured in the inner measuring volume.

19. A TDR transducer according to claim 18, wherein the second unshielded electrode section comprises:
the at least one signal plane including a first signal plane formed on the first measuring portion of the first substrate layer and being electrically connected to the distal end of the elongate signal trace, the first signal plane having a width that is greater than a width of the elongate signal trace and being located outside of the first and second ground planes;
the first elongate conductive body of the first elongate electrode being connected to electrical ground, such that the signal switches from radiating between the conductive signal trace and the first and second ground planes to radiating between the first signal plane and the first elongate conductive body across the inner elongate measuring volume of the second elongate transmission line segment.

20. The time domain reflectometer (TDR) transducer of claim 1, wherein the second elongate electrode portion comprises a printed circuit board (PCB) including superimposed alternating conductive and insulative layers and electrically connected to an electronic circuit, wherein one or more of said conductive layers includes one or more protrusions or gaps formed at given locations thereon, to cause anomalies that result in predictable echoes based on the given locations of said one or more protrusions or gaps when an RF signal is launched into the first shielded transmission line segment, for calibrating echo points of said TDR transducer.

21. A time domain reflectometer (TDR) transducer for determining at least one property of a material in a container, the TDR transducer comprising:
  an elongate measuring probe comprising:
    a first elongate electrode portion comprising an outer hollow cylindrically shaped electrode body formed of electrically conductive material;
    a second elongate electrode portion comprising a first shielded electrode section and a second unshielded electrode section;
    an inner measuring volume located between the first elongate electrode portion and the second elongate electrode portion for receiving material to be measured;
  wherein the first shielded electrode section is isolated from the outer hollow cylindrically shaped electrode body to thereby form a first shielded transmission line segment having a first nominal impedance value unaffected by the presence or absence of material to be measured in the inner measuring volume;
  wherein the second unshielded electrode section is electrically connected to the first shielded electrode section and spaced from the first conductive body by the inner measuring volume;
  wherein the outer hollow cylindrically shaped electrode body together with the second unshielded electrode section and the inner measuring volume form a second unshielded transmission line segment with a second nominal impedance value when the inner measuring volume is void of material to be measured;
  wherein both the first elongate electrode portion and the second elongate electrode portion are electrically and mechanically connected at respective proximal ends thereof to a mounting head containing an electronic circuit for transmitting and receiving electromagnetic signals along the first and second transmission line segments, the mounting head adapted for connecting to at least one of an upper or lower wall of the container; and
  wherein the outer hollow cylindrically shaped electrode body extends the length of both the first and second transmission line segments.

22. The time domain reflectometer (TDR) transducer of claim 21, wherein the first shielded electrode section extends along only a portion of the probe length.

23. The time domain reflectometer (TDR) transducer of claim 21, wherein the second elongate electrode portion comprises a printed circuit board (PCB), the PCB including superimposed or stacked alternating conductive and insulative layers and electrically connected to the electronic circuit, wherein the PCB is surrounded along its length by the outer hollow cylindrically shaped electrode body of the first elongate electrode portion.

24. The time domain reflectometer (TDR) transducer of claim 23, wherein the superimposed alternating conductive and insulative layers comprise a top most substrate layer and a bottom most substrate layer, each void of conductive traces and areas to thereby insulate internal conductive layers therebetween.

25. The time domain reflectometer (TDR) transducer of claim 23, wherein opposite ends of the elongate measuring probe are connected to corresponding mounting heads and respective transmit and receive electronic circuits, wherein an RF pulse is launched into the first shielded transmission line segment having the first shielded electrode section of said PCB and including ground planes, and emerges either above or below the surface of a material in the inner volume, depending on the direction of initial launch of a pulse through the shielded transmission line segment.

* * * * *